(12) United States Patent
Moss et al.

(10) Patent No.: US 12,203,496 B2
(45) Date of Patent: Jan. 21, 2025

(54) MOUNTING SYSTEM, DEVICE, AND METHOD

(71) Applicant: RMH Tech LLC, Colorado Springs, CO (US)

(72) Inventors: Jonathon Moss, Colorado Springs, CO (US); Dustin M. M. Haddock, Colorado Springs, CO (US); Nikolaus Jo Holley, Colorado Springs, CO (US)

(73) Assignee: RMH TECH LLC, Colorado Springs, CO (US)

( * ) Notice: Subject to any disclaimer, the term of this patent is extended or adjusted under 35 U.S.C. 154(b) by 729 days.

(21) Appl. No.: 17/371,888

(22) Filed: Jul. 9, 2021

(65) Prior Publication Data

US 2022/0010823 A1 Jan. 13, 2022

Related U.S. Application Data

(60) Provisional application No. 63/049,991, filed on Jul. 9, 2020.

(51) Int. Cl.
  *F16B 2/06* (2006.01)
  *E04D 1/00* (2006.01)
  *F16B 5/06* (2006.01)

(52) U.S. Cl.
  CPC ............ *F16B 2/065* (2013.01); *E04D 1/2942* (2019.08); *F16B 5/0607* (2013.01)

(58) Field of Classification Search
  CPC .... F16B 2/06; F16B 2/065; F16B 5/06; F16B 5/0607; F16B 5/0621; F16B 5/0635;
  (Continued)

(56) References Cited

U.S. PATENT DOCUMENTS 42,992 A  5/1864  Howe
97,316 A  11/1869 Rogers
(Continued)

FOREIGN PATENT DOCUMENTS

AT  13076  8/1903
AT  26329  11/1906
(Continued)

OTHER PUBLICATIONS

U.S. Appl. No. 14/257,747, filed Apr. 21, 2014 now U.S. Pat. No. 9,085,900.
(Continued)

*Primary Examiner* — Josh Skroupa
*Assistant Examiner* — Kevin J Baynes
(74) *Attorney, Agent, or Firm* — Sheridan Ross P.C.

(57) ABSTRACT

A mounting system for use with standing seams has a first side member with a mounting interface, a first foot, and a first aperture. A second side member of the mounting system has a first spacing arm, a second spacing arm, a second foot and a second aperture. The system may include a fastener extendable through the first aperture and the second aperture to secure the first side member to the second side member. One or more of the first spacing arm and the second spacing arm contact an interior surface of the first side member to ensure at least a minimum spacing between the first foot and the second foot when the first and second side members are secured together by the fastener.

20 Claims, 10 Drawing Sheets

(58) Field of Classification Search
CPC .... F16B 5/0657; F16B 5/0664; Y10T 403/53; Y10T 403/535; Y10T 403/70; Y10T 403/7062; Y10T 403/7067; Y10T 403/7069; E04D 1/2907; E04D 1/2914; E04D 1/2916; E04D 1/2918; E04D 1/2921; E04D 1/2942

See application file for complete search history.

(56) References Cited

U.S. PATENT DOCUMENTS

| | | |
|---|---|---|
| 106,580 A | 8/1870 | Hathorn |
| 189,431 A | 4/1877 | Creighton |
| 224,608 A | 2/1880 | Rendle |
| 250,580 A | 12/1881 | Rogers |
| 332,413 A | 12/1885 | List |
| 386,316 A | 7/1888 | Hawthorne |
| 405,605 A | 6/1889 | Sagendorph |
| 407,772 A | 7/1889 | Curtis et al. |
| 446,217 A | 2/1891 | Dickelman |
| 459,876 A | 9/1891 | Powers |
| 472,014 A | 3/1892 | Densmore |
| 473,512 A | 4/1892 | Laird |
| 491,173 A | 2/1893 | Hayward |
| 507,776 A | 10/1893 | Berger et al. |
| 529,774 A | 11/1894 | Baird |
| 602,983 A | 4/1898 | Folsom |
| 733,697 A | 7/1903 | Chronik |
| 756,884 A | 4/1904 | Parry |
| 831,445 A | 9/1906 | Kosmatka |
| 881,757 A | 3/1908 | Winsor |
| 884,850 A | 4/1908 | Peter |
| 927,522 A | 7/1909 | Gery |
| 933,784 A | 9/1909 | Peter |
| 939,516 A | 11/1909 | Laird |
| 942,693 A | 12/1909 | Wintermute |
| 1,054,091 A | 2/1913 | Darnall |
| 1,085,474 A | 1/1914 | Peterson |
| 1,136,460 A | 4/1915 | Wright |
| 1,230,363 A | 6/1917 | Baird |
| 1,279,669 A | 9/1918 | Deming |
| 1,330,309 A | 2/1920 | Dixon |
| 1,399,461 A | 12/1921 | Childs |
| 1,463,065 A | 7/1923 | Sieger |
| 1,465,042 A | 8/1923 | Hruska |
| 1,477,088 A | 12/1923 | Turner |
| 1,511,529 A | 10/1924 | Standlee |
| 1,620,428 A | 3/1927 | Becker |
| 1,723,166 A | 8/1929 | Hayman |
| 1,735,927 A | 11/1929 | Shaffer |
| 1,735,937 A | 11/1929 | Shaffer |
| 1,780,852 A | 11/1930 | Sullivan |
| 1,794,976 A | 3/1931 | Mueller |
| 1,812,009 A | 6/1931 | Lenke |
| 1,893,481 A | 1/1933 | Adams |
| 1,946,862 A | 2/1934 | Koch, Jr. |
| 1,957,933 A | 5/1934 | Brandl |
| 2,022,541 A | 11/1935 | Faistenhammer |
| 2,079,768 A | 5/1937 | Levow |
| 2,150,497 A | 3/1939 | Fernberg |
| 2,183,008 A | 12/1939 | Camp |
| 2,183,844 A | 12/1939 | Murphy |
| 2,192,720 A | 3/1940 | Tapman |
| 2,201,320 A | 5/1940 | Place |
| 2,250,401 A | 7/1941 | Sylvester |
| 2,274,010 A | 2/1942 | Stellin |
| 2,340,692 A | 2/1944 | Ridd |
| 2,356,833 A | 8/1944 | Doe |
| 2,429,833 A | 10/1947 | Luce |
| 2,443,362 A | 6/1948 | Tinnerman |
| 2,448,752 A | 9/1948 | Wagner |
| 2,457,250 A | 12/1948 | Macomber |
| 2,472,586 A | 6/1949 | Harvey |
| 2,504,776 A | 4/1950 | Woodfield et al. |
| 2,525,217 A | 10/1950 | Glitsch |
| 2,574,007 A | 11/1951 | Anderson |
| 2,658,247 A | 11/1953 | Heuer |
| 2,714,037 A | 7/1955 | Singer et al. |
| 2,730,381 A | 1/1956 | Curtiss |
| RE24,133 E | 3/1956 | Bloedow |
| 2,740,027 A | 3/1956 | Budd et al. |
| 2,808,491 A | 10/1957 | Rhee et al. |
| 2,810,173 A | 10/1957 | Bearden |
| 2,875,805 A | 3/1959 | Flora |
| 2,985,174 A | 5/1961 | Guth |
| 2,997,763 A | 8/1961 | Serfass |
| 3,039,161 A | 6/1962 | Gagnon |
| 3,064,772 A | 11/1962 | Clay |
| 3,095,672 A | 7/1963 | Di Tullio |
| 3,112,016 A | 11/1963 | Peterson |
| 3,136,206 A | 6/1964 | Adams |
| 3,194,524 A | 7/1965 | Trumbull |
| 3,208,119 A | 9/1965 | Alexander |
| 3,221,467 A | 12/1965 | Henkels |
| 3,231,076 A | 1/1966 | Frieman |
| 3,232,393 A | 2/1966 | Atwwod |
| 3,232,573 A | 2/1966 | Berman |
| 3,242,620 A | 3/1966 | Kaiser |
| 3,247,316 A | 4/1966 | Weimer, Jr. |
| 3,269,075 A | 8/1966 | Marini et al. |
| 3,288,409 A | 11/1966 | Bethea, Jr. |
| 3,296,750 A | 1/1967 | Zaleski |
| 3,298,653 A | 1/1967 | Omholt |
| 3,301,513 A | 1/1967 | Masao |
| 3,307,235 A | 3/1967 | Hennings |
| 3,318,057 A | 5/1967 | Norsworthy |
| 3,333,799 A | 8/1967 | Peterson |
| 3,335,995 A | 8/1967 | Pickles |
| 3,341,909 A | 9/1967 | Havener |
| 3,363,864 A | 1/1968 | Olgreen |
| 3,394,524 A | 7/1968 | Howarth |
| 3,398,018 A | 8/1968 | Walters |
| 3,425,127 A | 2/1969 | Long |
| 3,482,369 A | 12/1969 | Burke |
| 3,495,363 A | 2/1970 | Johnson |
| 3,496,691 A | 2/1970 | Seaburg et al. |
| 3,503,244 A | 3/1970 | Joslin |
| 3,523,709 A | 8/1970 | Heggy et al. |
| 3,527,619 A | 9/1970 | Miley |
| 3,528,050 A | 9/1970 | Hindenburg |
| 3,565,380 A | 2/1971 | Langren |
| 3,572,623 A | 3/1971 | Lapp |
| 3,590,543 A | 7/1971 | Heirich |
| 3,656,747 A | 4/1972 | Revell, Jr. et al. |
| 3,667,182 A | 6/1972 | Stemler |
| 3,667,185 A | 6/1972 | Maurer |
| 3,715,705 A | 2/1973 | Kuo |
| 3,719,919 A | 3/1973 | Tibolla |
| 3,753,326 A | 8/1973 | Kaufman, Sr. |
| 3,778,537 A | 12/1973 | Miller |
| 3,792,560 A | 2/1974 | Naylor |
| 3,809,799 A | 5/1974 | Taylor |
| 3,810,069 A | 5/1974 | Jaconette, Jr. |
| 3,817,270 A | 6/1974 | Ehrens et al. |
| 3,824,664 A | 7/1974 | Seeff |
| 3,845,601 A | 11/1974 | Kostecky |
| 3,861,098 A | 1/1975 | Schaub |
| 3,904,161 A | 9/1975 | Scott |
| 3,914,001 A | 10/1975 | Nelson et al. |
| 3,921,253 A | 11/1975 | Nelson |
| 3,934,385 A | 1/1976 | Paulus |
| 3,960,352 A | 6/1976 | Plattner et al. |
| 3,965,540 A | 6/1976 | Moore |
| 3,986,746 A | 10/1976 | Chartier |
| 3,998,018 A | 12/1976 | Hodges |
| 4,001,474 A | 1/1977 | Hereth |
| 4,007,574 A | 2/1977 | Riddell |
| 4,018,538 A | 4/1977 | Smyrni et al. |
| 4,034,532 A | 7/1977 | Reinwall, Jr. |
| 4,051,289 A | 9/1977 | Adamson |
| 4,084,289 A | 4/1978 | Naimo |
| 4,127,975 A | 12/1978 | Judkins |
| 4,130,970 A | 12/1978 | Cable |
| 4,132,390 A | 1/1979 | Pfarr, Jr. |
| 4,141,182 A | 2/1979 | McMullen |

(56) References Cited

U.S. PATENT DOCUMENTS

| | | |
|---|---|---|
| 4,147,257 A | 4/1979 | Zippel |
| 4,162,595 A | 7/1979 | Ramos et al. |
| 4,162,755 A | 7/1979 | Bott |
| 4,189,882 A | 2/1980 | Harrison et al. |
| 4,189,891 A | 2/1980 | Johnson et al. |
| 4,200,107 A | 4/1980 | Reid |
| 4,203,646 A | 5/1980 | Desso et al. |
| 4,203,648 A | 5/1980 | Seidler |
| 4,213,282 A | 7/1980 | Heckelsberg |
| 4,215,677 A | 8/1980 | Erickson |
| 4,223,053 A | 9/1980 | Brogan |
| 4,223,667 A | 9/1980 | Paymal |
| 4,252,458 A | 2/1981 | Keen |
| 4,261,338 A | 4/1981 | McAlister |
| 4,261,384 A | 4/1981 | Dahlbring |
| 4,263,474 A | 4/1981 | Tennant |
| 4,270,721 A | 6/1981 | Mainor, Jr. |
| 4,291,934 A | 9/1981 | Kund |
| 4,296,530 A | 10/1981 | Muller et al. |
| 4,307,976 A | 12/1981 | Butler |
| 4,321,416 A | 3/1982 | Tennant |
| 4,351,140 A | 9/1982 | Simpson |
| 4,358,916 A | 11/1982 | Lacasse |
| 4,366,656 A | 1/1983 | Simpson |
| 4,393,859 A | 7/1983 | Marossy et al. |
| 4,406,505 A | 9/1983 | Avramovich |
| 4,449,335 A | 5/1984 | Fahey |
| 4,456,321 A | 6/1984 | Jones et al. |
| 4,461,514 A | 7/1984 | Schwarz |
| 4,467,582 A | 8/1984 | Hague |
| 4,475,776 A | 10/1984 | Teramachi |
| D277,934 S | 3/1985 | Beckrot |
| 4,546,586 A | 10/1985 | Knudson |
| 4,560,224 A | 12/1985 | Weisenburger |
| 4,567,706 A | 2/1986 | Wendt |
| 4,570,405 A | 2/1986 | Knudson |
| 4,588,240 A | 5/1986 | Ruehl et al. |
| 4,593,877 A | 6/1986 | van der Wyk |
| 4,601,600 A | 7/1986 | Karlsson |
| 4,649,684 A | 3/1987 | Petree et al. |
| 4,656,794 A | 4/1987 | Thevenin et al. |
| 4,666,116 A | 5/1987 | Lloyd |
| 4,669,808 A | 6/1987 | Owen |
| 4,674,252 A | 6/1987 | Nicholas et al. |
| 4,682,454 A | 7/1987 | Simpson |
| 4,686,809 A | 8/1987 | Skelton |
| 4,701,586 A | 10/1987 | Hagberg |
| 4,704,058 A | 11/1987 | Crunwell |
| 4,753,425 A | 6/1988 | Yang |
| 4,773,791 A | 9/1988 | Hartkorn |
| 4,782,642 A | 11/1988 | Conville |
| 4,799,444 A | 1/1989 | Lisowski |
| 4,805,364 A | 2/1989 | Smolik |
| 4,809,476 A | 3/1989 | Satchell |
| 4,810,573 A | 3/1989 | Harriett |
| 4,835,927 A | 6/1989 | Michlovic |
| 4,840,529 A | 6/1989 | Phillips |
| 4,848,858 A | 7/1989 | Suzuki |
| 4,854,096 A | 8/1989 | Smolik |
| 4,864,081 A | 9/1989 | Bates |
| D304,421 S | 11/1989 | Holdaway |
| 4,878,331 A | 11/1989 | Taylor |
| 4,883,397 A | 11/1989 | Dubost |
| 4,895,338 A | 1/1990 | Froutzis |
| 4,901,963 A | 2/1990 | Yoder |
| 4,905,444 A | 3/1990 | Semaan |
| 4,909,011 A | 3/1990 | Freeman et al. |
| 4,949,929 A | 8/1990 | Kesselman et al. |
| 4,961,712 A | 10/1990 | Schwenk et al. |
| 4,970,833 A | 11/1990 | Porter |
| 4,987,699 A | 1/1991 | Gold |
| 4,991,368 A | 2/1991 | Amstutz |
| 4,993,959 A | 2/1991 | Randolph |
| 5,007,612 A | 4/1991 | Manfre |
| 5,019,111 A | 5/1991 | Dempsey et al. |
| 5,036,949 A | 8/1991 | Crocker et al. |
| 5,039,352 A | 8/1991 | Mueller |
| 5,092,939 A | 3/1992 | Nath et al. |
| 5,094,435 A | 3/1992 | Depperman |
| 5,118,571 A | 6/1992 | Petersen |
| 5,119,612 A | 6/1992 | Taylor et al. |
| 5,125,608 A | 6/1992 | McMaster et al. |
| 5,127,205 A | 7/1992 | Eidson |
| 5,138,820 A | 8/1992 | Pearce |
| 5,140,793 A | 8/1992 | Knudson |
| 5,152,107 A | 10/1992 | Strickert |
| 5,154,385 A | 10/1992 | Lindberg et al. |
| 5,164,020 A | 11/1992 | Wagner et al. |
| 5,176,462 A | 1/1993 | Chen |
| 5,187,911 A | 2/1993 | Cotter |
| 5,209,619 A | 5/1993 | Rinderer |
| 5,213,300 A | 5/1993 | Rees |
| 5,222,340 A | 6/1993 | Bellem |
| 5,224,427 A | 7/1993 | Riches et al. |
| 5,228,248 A | 7/1993 | Haddock |
| 5,251,993 A | 10/1993 | Sigourney |
| 5,268,038 A | 12/1993 | Riermeier et al. |
| 5,271,194 A | 12/1993 | Drew |
| 5,277,006 A | 1/1994 | Ruster |
| 5,282,340 A | 2/1994 | Cline et al. |
| 5,287,670 A | 2/1994 | Funaki |
| 5,290,366 A | 3/1994 | Riermeier et al. |
| 5,307,601 A | 5/1994 | McCracken |
| 5,312,079 A | 5/1994 | Little, Jr. |
| 5,313,752 A | 5/1994 | Hatzinikolas |
| D347,701 S | 6/1994 | McCracken |
| 5,352,154 A | 10/1994 | Rotter et al. |
| 5,356,519 A | 10/1994 | Grabscheid et al. |
| 5,356,705 A | 10/1994 | Kelch et al. |
| D351,989 S | 11/1994 | Cline et al. |
| 5,363,615 A | 11/1994 | Christopher et al. |
| 5,363,624 A | 11/1994 | Cotter |
| 5,379,567 A | 1/1995 | Vahey |
| 5,390,453 A | 2/1995 | Untiedt |
| 5,391,084 A | 2/1995 | Kreitzman |
| 5,392,574 A | 2/1995 | Sayers |
| 5,408,797 A | 4/1995 | Bellem |
| 5,409,549 A | 4/1995 | Mori |
| 5,413,063 A | 5/1995 | King |
| 5,413,397 A | 5/1995 | Gold |
| 5,417,028 A | 5/1995 | Meyer |
| 5,425,209 A | 6/1995 | Funaki |
| 5,426,906 A | 6/1995 | McCracken |
| 5,439,307 A | 8/1995 | Steinhilber |
| 5,453,027 A | 9/1995 | Buell et al. |
| D364,338 S | 11/1995 | Cline |
| 5,479,752 A | 1/1996 | Menegoli |
| 5,482,234 A | 1/1996 | Lyon |
| 5,483,772 A | 1/1996 | Haddock |
| 5,483,782 A | 1/1996 | Hall |
| 5,491,931 A | 2/1996 | Haddock |
| 5,497,591 A | 3/1996 | Nelson |
| 5,522,185 A | 6/1996 | Cline |
| 5,533,839 A | 7/1996 | Shimada |
| D372,421 S | 8/1996 | Cline |
| 5,557,903 A | 9/1996 | Haddock |
| D375,449 S | 11/1996 | Dahlberg |
| 5,571,338 A | 11/1996 | Kadonome et al. |
| 5,596,858 A | 1/1997 | Jordan |
| 5,596,859 A | 1/1997 | Horton et al. |
| 5,598,785 A | 2/1997 | Zaguroli, Jr. |
| 5,600,971 A | 2/1997 | Suk |
| D378,343 S | 3/1997 | Macor |
| 5,609,326 A | 3/1997 | Stearns et al. |
| 5,613,328 A | 3/1997 | Alley |
| 5,634,618 A | 6/1997 | Farmer, Jr. et al. |
| 5,640,812 A | 6/1997 | Crowley et al. |
| 5,647,178 A | 7/1997 | Cline |
| 5,651,837 A | 7/1997 | Ohtsuka et al. |
| 5,660,008 A | 8/1997 | Bevilacqua |
| 5,664,750 A | 9/1997 | Cohen |
| 5,667,181 A | 9/1997 | van Leeuwen et al. |
| D384,574 S | 10/1997 | Cox |
| 5,681,191 A | 10/1997 | Robicheau et al. |

(56) References Cited

U.S. PATENT DOCUMENTS

| | | |
|---|---|---|
| 5,688,131 A | 11/1997 | Byfield, Jr. |
| D387,064 S | 12/1997 | Heine |
| D387,443 S | 12/1997 | Blankenbiller |
| 5,694,721 A | 12/1997 | Haddock |
| 5,697,197 A | 12/1997 | Simpson |
| 5,715,640 A | 2/1998 | Haddock |
| 5,732,513 A | 3/1998 | Alley |
| 5,743,063 A | 4/1998 | Boozer |
| 5,743,497 A | 4/1998 | Michael |
| 5,746,029 A | 5/1998 | Ullman |
| 5,755,824 A | 5/1998 | Blechschmidt et al. |
| 5,765,310 A | 6/1998 | Gold |
| 5,765,329 A | 6/1998 | Huang |
| 5,787,653 A | 8/1998 | Sakai et al. |
| 5,794,386 A | 8/1998 | Klein |
| 5,809,703 A | 9/1998 | Kelly |
| 5,826,379 A | 10/1998 | Curry |
| 5,826,390 A | 10/1998 | Sacks |
| 5,828,008 A | 10/1998 | Lockwood et al. |
| 5,829,723 A | 11/1998 | Brunner et al. |
| 5,842,318 A | 12/1998 | Bass et al. |
| 5,853,296 A | 12/1998 | Gunther et al. |
| 5,857,301 A | 1/1999 | Fujita |
| 5,885,118 A | 3/1999 | Billenstein et al. |
| 5,890,340 A | 4/1999 | Kafarowski |
| 5,897,088 A | 4/1999 | Kirschner |
| 5,901,507 A | 5/1999 | Smeja et al. |
| 5,911,663 A | 6/1999 | Eidson |
| 5,942,046 A | 8/1999 | Kahlfuss et al. |
| 5,970,586 A | 10/1999 | Demel et al. |
| 5,983,588 A | 11/1999 | Haddock |
| 5,987,714 A | 11/1999 | Smith |
| 5,994,640 A | 11/1999 | Bansemir et al. |
| 5,997,368 A | 12/1999 | Mello et al. |
| 6,029,415 A | 2/2000 | Culpepper et al. |
| 6,073,410 A | 6/2000 | Schimpf et al. |
| 6,073,920 A | 6/2000 | Colley |
| 6,079,678 A | 6/2000 | Schott et al. |
| 6,083,010 A | 7/2000 | Daoud |
| 6,088,979 A | 7/2000 | Neal |
| 6,095,462 A | 8/2000 | Morgan |
| 6,099,203 A | 8/2000 | Landes |
| 6,105,317 A | 8/2000 | Tomiuchi et al. |
| 6,106,310 A | 8/2000 | Davis et al. |
| 6,111,189 A | 8/2000 | Garvison et al. |
| 6,119,317 A | 9/2000 | Pfister |
| 6,132,070 A | 10/2000 | Vosika et al. |
| 6,158,180 A | 12/2000 | Edwards |
| 6,164,033 A | 12/2000 | Haddock |
| 6,182,403 B1 | 2/2001 | Mimura et al. |
| 6,186,799 B1 | 2/2001 | Mello |
| 6,206,991 B1 | 3/2001 | Starr |
| 6,223,477 B1 | 5/2001 | Alley |
| 6,237,297 B1 | 5/2001 | Paroly |
| 6,253,496 B1 | 7/2001 | Gilchrist |
| 6,256,934 B1 | 7/2001 | Alley |
| 6,269,596 B1 | 8/2001 | Ohtsuka et al. |
| 6,276,285 B1 | 8/2001 | Ruch |
| 6,312,283 B1 | 11/2001 | Hio |
| 6,320,114 B1 | 11/2001 | Kuechler |
| 6,336,616 B1 | 1/2002 | Lin |
| 6,354,045 B1 | 3/2002 | Boone et al. |
| 6,360,491 B1 | 3/2002 | Ullman |
| 6,364,262 B1 | 4/2002 | Gibson et al. |
| 6,364,374 B1 | 4/2002 | Noone et al. |
| 6,370,828 B1 | 4/2002 | Genschorek |
| 6,382,569 B1 | 5/2002 | Schattner et al. |
| 6,385,914 B2 | 5/2002 | Alley |
| 6,393,796 B1 | 5/2002 | Goettl et al. |
| 6,443,680 B1 | 9/2002 | Bodin |
| 6,453,623 B1 | 9/2002 | Nelson et al. |
| 6,470,629 B1 | 10/2002 | Haddock |
| 6,497,080 B1 | 12/2002 | Malcolm |
| 6,499,259 B1 | 12/2002 | Hockman |
| 6,508,442 B1 | 1/2003 | Dolez |
| 6,521,821 B2 | 2/2003 | Makita et al. |
| 6,534,702 B1 | 3/2003 | Makita et al. |
| 6,536,166 B1 | 3/2003 | Alley |
| 6,536,729 B1 | 3/2003 | Haddock |
| 6,576,830 B2 | 6/2003 | Nagao et al. |
| 6,588,722 B2 | 7/2003 | Eguchi |
| 6,602,016 B2 | 8/2003 | Eckart et al. |
| 6,622,441 B2 | 9/2003 | Miller |
| 6,637,671 B2 | 10/2003 | Alley |
| 6,647,671 B1 | 11/2003 | Alley |
| 6,655,633 B1 | 12/2003 | Chapman, Jr. |
| 6,665,991 B2 | 12/2003 | Hasan |
| 6,688,047 B1 | 2/2004 | McNichol |
| D487,595 S | 3/2004 | Sherman |
| 6,715,256 B1 | 4/2004 | Fischer |
| 6,718,718 B2 | 4/2004 | Haddock |
| 6,725,623 B1 | 4/2004 | Riddell et al. |
| 6,730,841 B2 | 5/2004 | Heckeroth |
| 6,732,982 B1 | 5/2004 | Messinger |
| 6,751,919 B2 | 6/2004 | Calixto |
| D495,595 S | 9/2004 | Dressler |
| D496,738 S | 9/2004 | Sherman |
| 6,799,742 B2 | 10/2004 | Nakamura et al. |
| 6,834,466 B2 | 12/2004 | Trevorrow et al. |
| 6,918,217 B2 | 7/2005 | Jakob-Bamberg et al. |
| 6,918,727 B2 | 7/2005 | Huang |
| 6,922,948 B2 | 8/2005 | Smeja et al. |
| 6,967,278 B2 | 11/2005 | Hatsukaiwa et al. |
| D513,171 S | 12/2005 | Richardson |
| 7,012,188 B2 | 3/2006 | Erling |
| 7,013,612 B2 | 3/2006 | Haddock |
| 7,063,763 B2 | 6/2006 | Chapman, Jr. |
| 7,100,338 B2 | 9/2006 | Haddock |
| 7,104,020 B1 | 9/2006 | Suttle |
| 7,127,852 B1 | 10/2006 | Dressler |
| D532,291 S | 11/2006 | Geers |
| 7,191,794 B2 | 3/2007 | Hodges |
| 7,195,513 B1 | 3/2007 | Gherardini |
| 7,219,863 B1 | 5/2007 | Collett, II |
| 7,240,770 B2 | 7/2007 | Mullins et al. |
| 7,260,918 B2 | 8/2007 | Liebendorfer |
| 7,281,695 B2 | 10/2007 | Jordan |
| 7,340,863 B1 | 3/2008 | Dressler |
| 7,386,922 B1 | 6/2008 | Taylor et al. |
| 7,406,924 B1 | 8/2008 | Impey |
| 7,410,139 B1 | 8/2008 | Rorich |
| 7,431,252 B2 | 10/2008 | Birli et al. |
| 7,435,134 B2 | 10/2008 | Lenox |
| 7,451,573 B2 | 11/2008 | Orszulak et al. |
| 7,458,555 B2 | 12/2008 | Mastropaolo et al. |
| 7,459,196 B2 | 12/2008 | Sturm |
| 7,469,511 B2 | 12/2008 | Wobber |
| 7,493,730 B2 | 2/2009 | Fennell, Jr. |
| D589,337 S | 3/2009 | Karlsson |
| 7,513,080 B1 | 4/2009 | Showalter |
| 7,516,580 B2 | 4/2009 | Fennell, Jr. |
| 7,568,871 B2 | 8/2009 | Chopp, Jr. et al. |
| 7,574,839 B1 | 8/2009 | Simpson |
| 7,578,711 B2 | 8/2009 | Robinson |
| D600,543 S | 9/2009 | Coles |
| 7,600,349 B2 | 10/2009 | Liebendorfer |
| 7,658,356 B1 | 2/2010 | Nehls |
| 7,686,625 B1 | 3/2010 | Dyer et al. |
| 7,703,256 B2 | 4/2010 | Haddock |
| 7,707,800 B2 | 5/2010 | Kannisto |
| 7,712,278 B2 | 5/2010 | Lonardi |
| 7,721,492 B2 | 5/2010 | Plaisted et al. |
| 7,731,138 B2 | 6/2010 | Wiesner et al. |
| 7,733,667 B2 | 6/2010 | Qin et al. |
| 7,758,003 B2 | 7/2010 | Pourtier et al. |
| 7,758,011 B2 | 7/2010 | Haddock |
| 7,762,027 B1 | 7/2010 | Wentworth et al. |
| 7,766,292 B2 | 8/2010 | Liebendorfer |
| 7,780,472 B2 | 8/2010 | Lenox |
| 7,788,874 B2 | 9/2010 | Miller |
| 7,788,879 B2 | 9/2010 | Brandes et al. |
| 7,824,191 B1 | 11/2010 | Browder |
| 7,827,920 B2 | 11/2010 | Beck et al. |
| 7,845,127 B2 | 12/2010 | Brescia |

(56) References Cited

U.S. PATENT DOCUMENTS

| | | |
|---|---|---|
| 7,847,181 B2 | 12/2010 | Brescia |
| 7,861,480 B2 | 1/2011 | Wendelburg et al. |
| 7,861,485 B1 | 1/2011 | Wentworth et al. |
| 7,874,117 B1 | 1/2011 | Simpson |
| 7,891,618 B2 | 2/2011 | Carnevali |
| 7,895,808 B1 | 3/2011 | Wentworth et al. |
| 7,905,064 B1 | 3/2011 | Wentworth et al. |
| 7,915,519 B2 | 3/2011 | Kobayashi |
| 7,926,777 B2 | 4/2011 | Koesema, Jr. |
| 7,954,287 B2 | 6/2011 | Bravo et al. |
| 7,976,257 B2 | 7/2011 | Kufner et al. |
| 7,988,464 B2 | 8/2011 | Kossak et al. |
| 8,011,153 B2 | 9/2011 | Orchard |
| 8,066,200 B2 | 11/2011 | Hepner et al. |
| 8,070,119 B2 | 12/2011 | Taylor |
| 8,092,129 B2 | 1/2012 | Wiley et al. |
| 8,096,503 B2 | 1/2012 | Verweyen |
| 8,099,837 B2 | 1/2012 | Santlin et al. |
| D653,940 S | 2/2012 | Yasher |
| 8,109,048 B2 | 2/2012 | West |
| 8,146,299 B2 | 4/2012 | Stearns et al. |
| 8,151,522 B2 | 4/2012 | Stearns et al. |
| 8,153,700 B2 | 4/2012 | Stearns et al. |
| D658,977 S | 5/2012 | Riddell et al. |
| 8,181,926 B2 | 5/2012 | Magno, Jr. et al. |
| 8,226,061 B2 | 7/2012 | Nehls |
| 8,251,326 B2 | 8/2012 | McPheeters |
| 8,272,172 B2 | 9/2012 | Li |
| 8,294,026 B2 | 10/2012 | Wang et al. |
| D670,160 S | 11/2012 | Bitarchas |
| 8,312,678 B1 | 11/2012 | Haddock |
| 8,316,590 B2 | 11/2012 | Cusson |
| 8,316,621 B2 | 11/2012 | Safari Kermanshahi et al. |
| D674,513 S | 1/2013 | Liu |
| 8,344,239 B2 | 1/2013 | Plaisted |
| 8,347,572 B2 | 1/2013 | Piedmont |
| 8,375,654 B1 | 2/2013 | West et al. |
| 8,387,319 B1 | 3/2013 | Gilles-Gagnon et al. |
| 8,404,963 B2 | 3/2013 | Kobayashi |
| 8,407,895 B2 | 4/2013 | Hartelius et al. |
| 8,413,946 B2 | 4/2013 | Hartelius et al. |
| 8,424,821 B2 | 4/2013 | Liu |
| 8,430,372 B2 | 4/2013 | Haddock |
| D681,438 S | 5/2013 | Chen |
| D681,439 S | 5/2013 | Chen |
| 8,448,405 B2 | 5/2013 | Schaefer et al. |
| 8,453,986 B2 | 6/2013 | Schnitzer |
| 8,458,967 B2 | 6/2013 | Kalkanoglu et al. |
| 8,495,997 B1 | 7/2013 | Laubach |
| 8,505,254 B2 | 8/2013 | Welter et al. |
| 8,528,888 B2 | 9/2013 | Header |
| 8,567,030 B2 | 10/2013 | Koch |
| 8,584,424 B2 | 11/2013 | Smith |
| 8,590,223 B2 | 11/2013 | Kilgore et al. |
| 8,627,617 B2 | 1/2014 | Haddock et al. |
| 8,627,632 B2 | 1/2014 | Werner et al. |
| D699,176 S | 2/2014 | Salomon et al. |
| 8,640,402 B1 | 2/2014 | Bilge |
| 8,647,009 B2 | 2/2014 | Kobayashi |
| 8,656,649 B2 | 2/2014 | Haddock |
| 8,683,751 B2 | 4/2014 | Stearns |
| 8,695,290 B1 | 4/2014 | Kim et al. |
| 8,701,254 B2 | 4/2014 | Lin |
| 8,701,354 B2 | 4/2014 | Stearns et al. |
| 8,701,372 B2 | 4/2014 | Nuernberger et al. |
| 8,713,881 B2 | 5/2014 | DuPont et al. |
| 8,732,917 B2 * | 5/2014 | Zeilenga ............... H02S 20/23 52/24 |
| 8,733,027 B1 | 5/2014 | Marston et al. |
| 8,745,935 B2 | 6/2014 | DuPont et al. |
| 8,752,338 B2 | 6/2014 | Schaefer et al. |
| 8,756,870 B2 | 6/2014 | Teller et al. |
| 8,770,885 B2 | 7/2014 | Myers |
| 8,776,456 B1 | 7/2014 | Schrock |
| 8,782,983 B2 | 7/2014 | Stearns |
| 8,791,611 B2 | 7/2014 | Arnould et al. |
| 8,806,813 B2 | 8/2014 | Plaisted et al. |
| 8,806,815 B1 | 8/2014 | Liu et al. |
| 8,813,441 B2 | 8/2014 | Rizzo |
| 8,826,163 B1 | 9/2014 | Chanin et al. |
| 8,826,618 B2 | 9/2014 | Stearns |
| 8,829,330 B2 | 9/2014 | Meyer et al. |
| 8,833,714 B2 | 9/2014 | Haddock et al. |
| 8,839,573 B2 | 9/2014 | Cusson et al. |
| 8,839,575 B1 | 9/2014 | Liu et al. |
| 8,844,234 B2 | 9/2014 | Haddock et al. |
| 8,850,754 B2 | 10/2014 | Rizzo |
| 8,854,829 B1 | 10/2014 | Bopp et al. |
| 8,875,463 B2 | 11/2014 | Plagemann et al. |
| 8,888,431 B2 | 11/2014 | Haney |
| 8,893,441 B1 | 11/2014 | Hess, III et al. |
| 8,894,424 B2 | 11/2014 | DuPont |
| D718,703 S | 12/2014 | Rizzo |
| D718,704 S | 12/2014 | Rizzo |
| 8,904,718 B2 | 12/2014 | Schick et al. |
| 8,910,928 B2 | 12/2014 | Header |
| 8,919,053 B2 | 12/2014 | West |
| 8,920,586 B2 | 12/2014 | Poulakis |
| 8,925,263 B2 | 1/2015 | Haddock et al. |
| 8,935,893 B2 | 1/2015 | Liu et al. |
| 8,938,932 B1 | 1/2015 | Wentworth et al. |
| 8,950,157 B1 | 2/2015 | Schrock |
| 8,955,259 B2 | 2/2015 | Hemingway |
| 8,966,833 B2 | 3/2015 | Ally |
| 8,991,065 B2 | 3/2015 | Schrock |
| 8,998,660 B2 | 4/2015 | Bakos |
| 9,003,728 B2 | 4/2015 | Asci |
| 9,003,733 B1 | 4/2015 | Simpson et al. |
| 9,010,042 B2 | 4/2015 | Anderson et al. |
| 9,011,034 B2 | 4/2015 | Liu |
| 9,052,123 B2 | 6/2015 | Anderson et al. |
| 9,065,191 B2 | 6/2015 | Martin et al. |
| 9,068,339 B2 | 6/2015 | Schaefer et al. |
| 9,076,899 B2 | 7/2015 | Schrock |
| 9,080,792 B2 | 7/2015 | Patton |
| 9,085,900 B2 | 7/2015 | Haddock |
| 9,086,185 B2 | 7/2015 | Haddock |
| 9,097,443 B2 | 8/2015 | Liu et al. |
| 9,127,451 B1 | 9/2015 | Boor |
| 9,134,044 B2 | 9/2015 | Stearns et al. |
| 9,147,785 B2 | 9/2015 | Haddock et al. |
| 9,147,986 B2 | 9/2015 | Redel |
| D740,113 S | 10/2015 | Olenick |
| 9,166,524 B2 | 10/2015 | West et al. |
| 9,175,878 B2 | 11/2015 | Kemmer et al. |
| 9,175,881 B2 | 11/2015 | Schrock et al. |
| 9,194,130 B1 | 11/2015 | Stanley |
| 9,194,613 B2 | 11/2015 | Nuernberger et al. |
| 9,200,456 B2 | 12/2015 | Murphy |
| 9,222,263 B2 | 12/2015 | Haddock |
| 9,223,907 B2 | 12/2015 | Chanin et al. |
| 9,243,817 B2 | 1/2016 | West |
| 9,273,708 B2 | 3/2016 | Urban |
| 9,273,885 B2 | 3/2016 | Rodrigues et al. |
| 9,291,369 B2 | 3/2016 | West et al. |
| 9,299,868 B2 | 3/2016 | Thomas |
| 9,306,490 B2 | 4/2016 | Haddock et al. |
| 9,309,910 B2 | 4/2016 | Anderson et al. |
| 9,331,629 B2 | 5/2016 | Cheung et al. |
| 9,341,285 B2 | 5/2016 | Magno, Jr. et al. |
| 9,376,812 B2 | 6/2016 | Porter |
| 9,416,803 B1 | 8/2016 | McGarity et al. |
| 9,431,953 B2 | 8/2016 | Stearns |
| 9,447,988 B2 | 9/2016 | Stearns et al. |
| 9,473,064 B2 | 10/2016 | Schaefer |
| 9,473,066 B2 | 10/2016 | Stehan et al. |
| 9,479,110 B2 | 10/2016 | Patton et al. |
| 9,496,697 B1 | 11/2016 | Wentworth |
| 9,518,596 B2 | 12/2016 | West et al. |
| 9,530,916 B2 | 12/2016 | Haddock et al. |
| 9,531,319 B2 * | 12/2016 | Braunstein ............... F24S 25/00 |
| 9,534,390 B2 | 1/2017 | Pendley et al. |
| 9,587,427 B2 | 3/2017 | Webb |
| 9,599,280 B2 | 3/2017 | West et al. |

(56) References Cited

U.S. PATENT DOCUMENTS

| | | | |
|---|---|---|---|
| 9,608,559 B2 | 3/2017 | Haddock et al. | |
| 9,611,652 B2 | 4/2017 | Haddock et al. | |
| 9,647,433 B2 | 5/2017 | Meine | |
| 9,647,607 B2 | 5/2017 | Patton et al. | |
| 9,660,570 B2 * | 5/2017 | Stephan | F16B 5/0028 |
| 9,689,411 B2 | 6/2017 | Meine et al. | |
| 9,712,106 B2 | 7/2017 | Wentworth et al. | |
| 9,714,670 B2 | 7/2017 | Header | |
| 9,722,532 B2 | 8/2017 | Almy | |
| 9,732,512 B2 | 8/2017 | Haddock | |
| 9,742,173 B2 | 8/2017 | Wentworth | |
| 9,755,572 B2 | 9/2017 | Wentworth et al. | |
| D800,055 S | 10/2017 | Rothschild | |
| 9,813,012 B2 | 11/2017 | Wentworth et al. | |
| 9,813,013 B2 | 11/2017 | McPheeters et al. | |
| 9,819,303 B2 | 11/2017 | Ash | |
| 9,831,817 B2 | 11/2017 | Rothschild | |
| 9,845,584 B1 | 12/2017 | Goldammer | |
| 9,845,599 B2 | 12/2017 | Bogh et al. | |
| 9,850,661 B2 | 12/2017 | Kovacs | |
| 9,853,593 B2 | 12/2017 | Cinnamon et al. | |
| 9,853,594 B2 | 12/2017 | Almy | |
| 9,863,665 B2 | 1/2018 | West | |
| 9,865,938 B2 | 1/2018 | Meine et al. | |
| 9,876,463 B2 | 1/2018 | Jasmin | |
| 9,893,676 B2 | 2/2018 | Anderson et al. | |
| 9,893,677 B1 | 2/2018 | Liu | |
| 9,920,958 B2 | 3/2018 | Haddock et al. | |
| 9,926,706 B2 | 3/2018 | Hockman | |
| 9,966,745 B2 | 5/2018 | Wentworth | |
| 9,985,361 B2 | 5/2018 | Martin | |
| 9,985,575 B2 | 5/2018 | Stearns et al. | |
| 9,988,816 B2 * | 6/2018 | Zhang | E04D 1/34 |
| 10,021,986 B1 * | 7/2018 | Lin | A47C 1/124 |
| 10,036,414 B2 | 7/2018 | Wiley et al. | |
| 10,036,576 B1 | 7/2018 | Robinson | |
| D827,160 S | 8/2018 | Menton | |
| 10,053,856 B2 | 8/2018 | Haddock | |
| 10,054,336 B2 | 8/2018 | Haddock et al. | |
| D827,873 S | 9/2018 | Menton | |
| D827,874 S | 9/2018 | Menton | |
| 10,077,562 B2 | 9/2018 | Haddock et al. | |
| 10,090,800 B2 | 10/2018 | McPheeters | |
| 10,103,682 B2 | 10/2018 | Haddock et al. | |
| 10,103,683 B2 | 10/2018 | Wentworth | |
| 10,106,987 B2 | 10/2018 | Haddock et al. | |
| 10,141,662 B2 | 11/2018 | Bernard et al. | |
| 10,186,791 B2 | 1/2019 | Meine et al. | |
| D841,096 S | 2/2019 | Boyer | |
| 10,202,991 B2 | 2/2019 | Lewis | |
| 10,202,995 B2 | 2/2019 | Stickelberger et al. | |
| 10,205,418 B2 | 2/2019 | Nayar | |
| 10,208,874 B2 | 2/2019 | Geiger et al. | |
| 10,211,773 B2 | 2/2019 | Jasmin et al. | |
| 10,211,775 B1 | 2/2019 | Wentworth et al. | |
| 10,218,305 B1 | 2/2019 | Schrock | |
| 10,240,820 B2 | 3/2019 | Ash et al. | |
| 10,291,176 B2 | 5/2019 | Wentworth et al. | |
| 10,312,855 B2 | 6/2019 | Lester et al. | |
| 10,337,764 B2 | 7/2019 | Ash et al. | |
| 10,359,069 B2 | 7/2019 | Ash et al. | |
| 10,385,573 B2 | 8/2019 | Van Leuven | |
| 10,443,896 B2 | 10/2019 | Haddock et al. | |
| 10,454,190 B1 | 10/2019 | Martin | |
| 10,472,828 B2 | 11/2019 | Stearns et al. | |
| 10,502,457 B2 | 12/2019 | Haddock et al. | |
| 10,505,492 B2 | 12/2019 | Hudson et al. | |
| 10,511,252 B2 | 12/2019 | Wentworth et al. | |
| 10,530,293 B2 | 1/2020 | Legall et al. | |
| 10,551,090 B2 | 2/2020 | De Vogel et al. | |
| 10,594,251 B2 | 3/2020 | Stearns et al. | |
| 10,622,935 B1 | 4/2020 | Liu | |
| 10,634,175 B2 | 4/2020 | Haddock | |
| 10,640,980 B2 | 5/2020 | Haddock | |
| 10,644,643 B2 | 5/2020 | Stearns et al. | |
| 10,673,151 B2 | 6/2020 | Ash et al. | |
| 10,676,933 B2 * | 6/2020 | Van Leuven | E04D 13/10 |
| 10,686,401 B2 | 6/2020 | Ash et al. | |
| D890,601 S | 7/2020 | Gori | |
| D890,602 S | 7/2020 | Gori | |
| 10,731,355 B2 | 8/2020 | Haddock et al. | |
| 10,749,459 B1 | 8/2020 | Liu et al. | |
| 10,749,466 B2 | 8/2020 | Smeja | |
| 10,763,777 B2 | 9/2020 | Stearns et al. | |
| 10,797,634 B1 | 10/2020 | Jasmin et al. | |
| 10,816,240 B2 | 10/2020 | Robinson | |
| D902,163 S | 11/2020 | Ice | |
| 10,837,476 B2 | 11/2020 | Lewis | |
| 10,851,826 B2 | 12/2020 | Ash et al. | |
| 10,859,292 B2 | 12/2020 | Haddock et al. | |
| 10,868,491 B2 | 12/2020 | Wentworth et al. | |
| 10,903,785 B2 | 1/2021 | Haddock et al. | |
| D909,853 S | 2/2021 | Jasmin | |
| 10,931,225 B2 | 2/2021 | Yang et al. | |
| 10,948,002 B2 | 3/2021 | Haddock | |
| 11,009,262 B2 | 5/2021 | Ash et al. | |
| 11,012,023 B2 | 5/2021 | Stearns et al. | |
| D923,203 S | 6/2021 | Muther | |
| D923,823 S | 6/2021 | Muther | |
| 11,035,126 B2 | 6/2021 | Haddock et al. | |
| 11,041,310 B1 | 6/2021 | Haddock et al. | |
| 11,118,353 B2 | 9/2021 | Stearns et al. | |
| 11,121,484 B2 | 9/2021 | Ash et al. | |
| 11,121,669 B2 | 9/2021 | Stearns et al. | |
| 11,139,773 B2 | 10/2021 | Eriksson | |
| 11,139,774 B2 | 10/2021 | Wentworth et al. | |
| 11,189,941 B2 | 11/2021 | Ash et al. | |
| 11,196,187 B2 | 12/2021 | Ash et al. | |
| 11,201,581 B2 | 12/2021 | Stearns et al. | |
| 11,296,648 B1 | 4/2022 | Jasmin et al. | |
| 11,368,005 B2 | 6/2022 | Meine et al. | |
| D962,047 S | 8/2022 | Muther | |
| 11,549,724 B2 | 1/2023 | Zhu | |
| 11,552,591 B2 | 1/2023 | Jasmin et al. | |
| 11,575,343 B2 | 2/2023 | Wentworth et al. | |
| D983,015 S | 4/2023 | Jasmin et al. | |
| D983,016 S | 4/2023 | Jasmin et al. | |
| D983,017 S | 4/2023 | Jasmin et al. | |
| D983,018 S | 4/2023 | Jasmin et al. | |
| D983,019 S | 4/2023 | Jasmin et al. | |
| 11,621,665 B2 | 4/2023 | Jasmin et al. | |
| D984,872 S | 5/2023 | Jasmin et al. | |
| 11,646,692 B2 | 5/2023 | Wentworth et al. | |
| 11,750,143 B1 | 9/2023 | Jasmin et al. | |
| 11,757,400 B1 | 9/2023 | Jasmin et al. | |
| 11,770,097 B1 | 9/2023 | Jasmin et al. | |
| 11,815,292 B2 | 11/2023 | Markiewicz | |
| 11,848,638 B1 | 12/2023 | Jasmin | |
| 11,876,482 B1 | 1/2024 | Jasmin et al. | |
| 11,881,808 B1 | 1/2024 | Jasmin et al. | |
| 11,949,373 B1 | 4/2024 | Jasmin et al. | |
| 12,009,774 B1 | 6/2024 | Jasmin | |
| 12,057,801 B1 | 8/2024 | Jasmin et al. | |
| 2002/0026765 A1 | 3/2002 | Vahey | |
| 2002/0088196 A1 | 7/2002 | Haddock | |
| 2002/0160635 A1 | 10/2002 | Kurrer et al. | |
| 2003/0015637 A1 | 1/2003 | Liebendorfer | |
| 2003/0062078 A1 | 4/2003 | Mimura | |
| 2003/0070368 A1 | 4/2003 | Shingleton | |
| 2003/0080267 A1 | 5/2003 | Eslick | |
| 2003/0131551 A1 | 7/2003 | Mollinger et al. | |
| 2003/0146346 A1 | 8/2003 | Chapman, Jr. | |
| 2003/0173460 A1 | 9/2003 | Chapman, Jr. | |
| 2003/0201009 A1 | 10/2003 | Nakajima et al. | |
| 2004/0035065 A1 | 2/2004 | Orszulak et al. | |
| 2004/0055233 A1 | 3/2004 | Showalter | |
| 2004/0164208 A1 | 8/2004 | Nielson et al. | |
| 2004/0231949 A1 | 11/2004 | Le et al. | |
| 2004/0237465 A1 | 12/2004 | Refond | |
| 2005/0095062 A1 | 5/2005 | Iverson et al. | |
| 2005/0102958 A1 | 5/2005 | Anderson | |
| 2005/0115176 A1 | 6/2005 | Russell | |
| 2005/0117997 A1 | 6/2005 | Pinzl | |
| 2005/0210769 A1 | 9/2005 | Harvey | |

(56) References Cited

U.S. PATENT DOCUMENTS

| | | | |
|---|---|---|---|
| 2005/0217203 A1* | 10/2005 | Haddock | F16B 2/10 52/782.1 |
| 2005/0257434 A1 | 11/2005 | Hockman | |
| 2006/0065805 A1 | 3/2006 | Barton et al. | |
| 2006/0075691 A1 | 4/2006 | Verkamlp | |
| 2006/0096061 A1 | 5/2006 | Weiland et al. | |
| 2006/0118163 A1 | 6/2006 | Plaisted et al. | |
| 2006/0174571 A1 | 8/2006 | Panasik et al. | |
| 2006/0174931 A1 | 8/2006 | Mapes et al. | |
| 2006/0254192 A1 | 11/2006 | Fennell, Jr. | |
| 2007/0075198 A1 | 4/2007 | Foser | |
| 2007/0131273 A1 | 6/2007 | Kobayashi | |
| 2007/0194191 A1 | 8/2007 | Persson | |
| 2007/0199590 A1 | 8/2007 | Tanaka et al. | |
| 2007/0241238 A1 | 10/2007 | Neace | |
| 2007/0246039 A1 | 10/2007 | Brazier et al. | |
| 2007/0248434 A1 | 10/2007 | Wiley et al. | |
| 2007/0289229 A1 | 12/2007 | Aldo | |
| 2007/0289233 A1 | 12/2007 | Haddock | |
| 2008/0035140 A1 | 2/2008 | Placer et al. | |
| 2008/0041011 A1 | 2/2008 | Kannisto | |
| 2008/0095591 A1 | 4/2008 | Wu | |
| 2008/0184639 A1 | 8/2008 | Cotter | |
| 2008/0190047 A1 | 8/2008 | Allen | |
| 2008/0236520 A1 | 10/2008 | Maehara et al. | |
| 2008/0265232 A1 | 10/2008 | Terrels et al. | |
| 2008/0292424 A1 | 11/2008 | Kufner | |
| 2008/0302407 A1 | 12/2008 | Kobayashi | |
| 2009/0000220 A1 | 1/2009 | Lenox | |
| 2009/0007520 A1 | 1/2009 | Navon | |
| 2009/0194098 A1 | 8/2009 | Placer | |
| 2009/0223741 A1 | 9/2009 | Picard, Jr. | |
| 2009/0229213 A1 | 9/2009 | Mistelski | |
| 2009/0230205 A1 | 9/2009 | Hepner et al. | |
| 2009/0320826 A1 | 12/2009 | Kufner | |
| 2010/0012805 A1 | 1/2010 | Taylor | |
| 2010/0058701 A1 | 3/2010 | Yao et al. | |
| 2010/0133040 A1 | 6/2010 | London | |
| 2010/0154784 A1 | 6/2010 | King et al. | |
| 2010/0162641 A1 | 7/2010 | Reyal et al. | |
| 2010/0171016 A1 | 7/2010 | Haddock | |
| 2010/0175738 A1 | 7/2010 | Huss et al. | |
| 2010/0192334 A1 | 8/2010 | Reichle et al. | |
| 2010/0192505 A1 | 8/2010 | Schaefer et al. | |
| 2010/0193651 A1 | 8/2010 | Railsback et al. | |
| 2010/0206303 A1 | 8/2010 | Thorne | |
| 2010/0212720 A1 | 8/2010 | Meyer et al. | |
| 2010/0276558 A1 | 11/2010 | Faust et al. | |
| 2010/0281784 A1 | 11/2010 | Leo | |
| 2010/0282290 A1 | 11/2010 | Schwarze | |
| 2010/0288337 A1 | 11/2010 | Rizzo | |
| 2010/0293874 A1 | 11/2010 | Liebendorfer | |
| 2010/0314517 A1 | 12/2010 | Patzer | |
| 2011/0000151 A1 | 1/2011 | Hochreiter | |
| 2011/0039458 A1 | 2/2011 | Byrne | |
| 2011/0078892 A1 | 4/2011 | Hartelius et al. | |
| 2011/0088340 A1 | 4/2011 | Stobbe | |
| 2011/0120047 A1 | 5/2011 | Stearns et al. | |
| 2011/0138585 A1 | 6/2011 | Kmita et al. | |
| 2011/0154750 A1 | 6/2011 | Welter et al. | |
| 2011/0174360 A1 | 7/2011 | Plaisted et al. | |
| 2011/0179606 A1 | 7/2011 | Magno, Jr. et al. | |
| 2011/0209745 A1 | 9/2011 | Korman | |
| 2011/0214365 A1 | 9/2011 | Aftanas | |
| 2011/0214388 A1 | 9/2011 | London | |
| 2011/0232212 A1 | 9/2011 | Pierson et al. | |
| 2011/0239546 A1 | 10/2011 | Tsuzuki et al. | |
| 2011/0247292 A1 | 10/2011 | Li | |
| 2011/0260027 A1 | 10/2011 | Farnham, Jr. | |
| 2011/0271611 A1 | 11/2011 | Maracci et al. | |
| 2011/0272545 A1 | 11/2011 | Liu | |
| 2011/0277296 A1 | 11/2011 | Ramos | |
| 2011/0314752 A1 | 12/2011 | Meier | |
| 2012/0073630 A1 | 3/2012 | Wu | |
| 2012/0079781 A1 | 4/2012 | Koller | |
| 2012/0085041 A1 | 4/2012 | Place | |
| 2012/0099943 A1 | 4/2012 | Chiu | |
| 2012/0102853 A1 | 5/2012 | Rizzo | |
| 2012/0153108 A1 | 6/2012 | Schneider | |
| 2012/0167364 A1 | 7/2012 | Koch et al. | |
| 2012/0175322 A1 | 7/2012 | Park et al. | |
| 2012/0192519 A1 | 8/2012 | Ray | |
| 2012/0193310 A1 | 8/2012 | Fluhrer et al. | |
| 2012/0201601 A1 | 8/2012 | Rizzo | |
| 2012/0223033 A1 | 9/2012 | Molek | |
| 2012/0244729 A1 | 9/2012 | Rivera et al. | |
| 2012/0248271 A1 | 10/2012 | Zeilenga | |
| 2012/0298188 A1 | 11/2012 | West et al. | |
| 2012/0299233 A1 | 11/2012 | Header | |
| 2012/0325761 A1 | 12/2012 | Kubsch et al. | |
| 2013/0011187 A1 | 1/2013 | Schuit et al. | |
| 2013/0014809 A1 | 1/2013 | Sagayama | |
| 2013/0048056 A1 | 2/2013 | Kilgore et al. | |
| 2013/0074428 A1 | 3/2013 | Allen | |
| 2013/0089388 A1 | 4/2013 | Liu et al. | |
| 2013/0091692 A1 | 4/2013 | Stanley | |
| 2013/0118545 A1 | 5/2013 | Bosler et al. | |
| 2013/0149030 A1 | 6/2013 | Merhar et al. | |
| 2013/0167470 A1 | 7/2013 | Montgomery et al. | |
| 2013/0168525 A1 | 7/2013 | Haddock | |
| 2013/0220403 A1 | 8/2013 | Rizzo | |
| 2013/0227833 A1 | 9/2013 | Rizzo | |
| 2013/0263917 A1 | 10/2013 | Hamamura | |
| 2013/0313043 A1 | 11/2013 | Lallier | |
| 2013/0334151 A1 | 12/2013 | Kanczuzewski et al. | |
| 2013/0340358 A1 | 12/2013 | Danning | |
| 2014/0000681 A1 | 1/2014 | Zhao et al. | |
| 2014/0003861 A1 | 1/2014 | Cheung | |
| 2014/0041202 A1 | 2/2014 | Schnitzer et al. | |
| 2014/0042286 A1 | 2/2014 | Jaffari | |
| 2014/0069048 A1 | 3/2014 | Ally | |
| 2014/0096462 A1 | 4/2014 | Haddock | |
| 2014/0096463 A1 | 4/2014 | Prentice | |
| 2014/0179133 A1 | 6/2014 | Redel | |
| 2014/0220834 A1 | 8/2014 | Rizzo | |
| 2014/0231605 A1 | 8/2014 | Sharpe et al. | |
| 2014/0260068 A1 | 9/2014 | Pendley et al. | |
| 2014/0283467 A1 | 9/2014 | Chabas et al. | |
| 2014/0290718 A1 | 10/2014 | Jackson, Jr. | |
| 2014/0338273 A1 | 11/2014 | Stapleton | |
| 2014/0341645 A1 | 11/2014 | Liu et al. | |
| 2015/0052834 A1 | 2/2015 | Gies et al. | |
| 2015/0060620 A1 | 3/2015 | Smeja | |
| 2015/0107168 A1 | 4/2015 | Kobayashi | |
| 2015/0129517 A1 | 5/2015 | Wildes | |
| 2015/0171787 A1 | 6/2015 | Genschorek | |
| 2015/0200620 A1 | 7/2015 | Haddock et al. | |
| 2015/0214884 A1 | 7/2015 | Rizzo | |
| 2015/0249423 A1 | 9/2015 | Braunstein et al. | |
| 2015/0316086 A1 | 11/2015 | Urban | |
| 2016/0025262 A1 | 1/2016 | Stearns et al. | |
| 2016/0043686 A1 | 2/2016 | Hsueh | |
| 2016/0049901 A1 | 2/2016 | Muther et al. | |
| 2016/0060869 A1 | 3/2016 | Smeja | |
| 2016/0079909 A1 | 3/2016 | Franklin | |
| 2016/0087576 A1 | 3/2016 | Johansen et al. | |
| 2016/0111835 A1 | 4/2016 | Nayar | |
| 2016/0111997 A1 | 4/2016 | Ganshaw et al. | |
| 2016/0111998 A1 | 4/2016 | Schmid | |
| 2016/0130815 A1 | 5/2016 | Menegoli | |
| 2016/0160492 A1 | 6/2016 | Gower | |
| 2016/0160524 A1 | 6/2016 | Malins | |
| 2016/0176105 A1 | 6/2016 | Stanley | |
| 2016/0177984 A1 | 6/2016 | Kovacs et al. | |
| 2016/0233820 A1 | 8/2016 | Redel | |
| 2016/0268958 A1 | 9/2016 | Wildes et al. | |
| 2017/0040928 A1 | 2/2017 | Schuit et al. | |
| 2017/0067258 A1 | 3/2017 | Stearns et al. | |
| 2017/0073974 A1 | 3/2017 | Kovacs | |
| 2017/0107723 A1 | 4/2017 | Stearns et al. | |
| 2017/0237386 A1 | 8/2017 | Stephan et al. | |
| 2017/0301265 A1 | 10/2017 | Kyle et al. | |
| 2017/0302220 A1 | 10/2017 | Martin | |
| 2017/0302221 A1 | 10/2017 | Jasmin | |

(56) References Cited

U.S. PATENT DOCUMENTS

| | | |
|---|---|---|
| 2017/0336021 A1 | 11/2017 | Anderson |
| 2018/0013382 A1 | 1/2018 | Smeja |
| 2018/0062570 A1 | 3/2018 | Murakami |
| 2018/0119425 A1 | 5/2018 | Kovacs |
| 2018/0167026 A1 | 6/2018 | Xie |
| 2018/0323744 A1 | 11/2018 | Hudson |
| 2019/0013772 A1 | 1/2019 | Bamat et al. |
| 2019/0049151 A1 | 2/2019 | Harris et al. |
| 2019/0068114 A1 | 2/2019 | Lu |
| 2019/0106885 A1 | 4/2019 | Stearns et al. |
| 2019/0123460 A1 | 4/2019 | Ash et al. |
| 2019/0165717 A1 | 5/2019 | Haddock et al. |
| 2019/0169856 A1* | 6/2019 | Haddock .......... F24S 25/636 |
| 2019/0178274 A1 | 6/2019 | Katz |
| 2019/0195252 A1 | 6/2019 | Pryor et al. |
| 2019/0221696 A1 | 7/2019 | Kubo et al. |
| 2019/0226214 A1 | 7/2019 | Van Leuven |
| 2019/0273460 A1 | 9/2019 | Kovacs |
| 2019/0285224 A1 | 9/2019 | McKechnie et al. |
| 2019/0326847 A1 | 10/2019 | Zuritis |
| 2019/0330853 A1 | 10/2019 | Van Leuven |
| 2019/0343085 A1 | 11/2019 | Donado |
| 2019/0345719 A1 | 11/2019 | Header |
| 2019/0363667 A1 | 11/2019 | Braunstein et al. |
| 2019/0372501 A1 | 12/2019 | Wada et al. |
| 2020/0144959 A1 | 5/2020 | Stearns et al. |
| 2020/0208463 A1 | 7/2020 | Mascarenhas et al. |
| 2020/0208658 A1 | 7/2020 | Roman |
| 2020/0217339 A1 | 7/2020 | Haddock |
| 2020/0252023 A1 | 8/2020 | Stearns et al. |
| 2020/0263432 A1 | 8/2020 | Haddock |
| 2020/0313603 A1 | 10/2020 | Uppu |
| 2020/0313604 A1 | 10/2020 | Harris et al. |
| 2020/0313611 A1 | 10/2020 | Ash et al. |
| 2020/0318349 A1 | 10/2020 | Stearns et al. |
| 2020/0321763 A1 | 10/2020 | Joshi et al. |
| 2020/0340712 A1 | 10/2020 | Leitch et al. |
| 2020/0362632 A1 | 11/2020 | Fort |
| 2021/0005115 A1 | 1/2021 | Johnson |
| 2021/0028741 A1 | 1/2021 | Stearns et al. |
| 2021/0067085 A1 | 3/2021 | Stearns et al. |
| 2021/0079947 A1 | 3/2021 | Ash et al. |
| 2021/0104973 A1 | 4/2021 | Stearns et al. |
| 2021/0111546 A1 | 4/2021 | Varale |
| 2021/0140681 A1 | 5/2021 | Haddock et al. |
| 2021/0143771 A1 | 5/2021 | Haddock et al. |
| 2021/0159843 A1 | 5/2021 | Stearns et al. |
| 2021/0167720 A1 | 6/2021 | Stearns et al. |
| 2021/0184626 A1 | 6/2021 | Yang et al. |
| 2021/0194157 A1 | 6/2021 | Ash et al. |
| 2021/0194158 A1 | 6/2021 | Ash et al. |
| 2021/0199141 A1 | 7/2021 | Haddock |
| 2021/0265940 A1 | 8/2021 | Stearns et al. |
| 2021/0376781 A1 | 12/2021 | Stearns et al. |
| 2021/0376782 A1 | 12/2021 | Stearns et al. |
| 2021/0388618 A1 | 12/2021 | Stearns et al. |
| 2022/0140771 A1 | 5/2022 | Stearns et al. |
| 2022/0145634 A1 | 5/2022 | Stearns et al. |
| 2022/0149545 A1 | 5/2022 | Ash et al. |
| 2022/0178586 A1 | 6/2022 | Ash et al. |
| 2022/0275813 A1 | 9/2022 | Haddock |
| 2022/0278516 A1 | 9/2022 | Meine et al. |
| 2022/0298795 A1 | 9/2022 | Haddock et al. |
| 2023/0036926 A1 | 2/2023 | Jovanovic et al. |
| 2023/0151834 A1 | 5/2023 | Kovacs |
| 2023/0170840 A1 | 6/2023 | Stearns et al. |
| 2023/0198460 A1 | 6/2023 | Jasmin et al. |
| 2023/0261606 A1 | 8/2023 | Stearns et al. |
| 2023/0336108 A1 | 10/2023 | Morano |
| 2023/0396208 A1 | 12/2023 | Pedlar et al. |
| 2023/0399850 A1 | 12/2023 | Haddock et al. |
| 2023/0402958 A1 | 12/2023 | Jasmin |
| 2024/0014770 A1 | 1/2024 | Moss et al. |
| 2024/0022207 A1 | 1/2024 | Jasmin et al. |
| 2024/0027103 A1 | 1/2024 | Leitch et al. |
| 2024/0068237 A1 | 2/2024 | Haddock |
| 2024/0097415 A1 | 3/2024 | Ash et al. |
| 2024/0167289 A1 | 5/2024 | Haddock et al. |
| 2024/0167730 A1 | 5/2024 | Jasmin et al. |
| 2024/0171115 A1 | 5/2024 | Jasmin et al. |
| 2024/0195347 A1 | 6/2024 | Jasmin |
| 2024/0227688 A1 | 7/2024 | Morano |
| 2024/0271424 A1 | 8/2024 | Haddock et al. |

FOREIGN PATENT DOCUMENTS

| | | |
|---|---|---|
| AT | 298762 | 5/1972 |
| AT | 509330 | 8/2011 |
| AU | 2005201707 | 11/2006 |
| AU | 2009101276 | 1/2010 |
| AU | 2009245849 | 6/2010 |
| AU | 2014362215 | 6/2015 |
| AU | 2017203660 | 10/2018 |
| AU | 2016294152 | 12/2018 |
| CA | 2704915 | 9/2011 |
| CA | 2751963 | 3/2013 |
| CH | 204783 | 5/1939 |
| CH | 388590 | 2/1965 |
| CH | 469159 | 2/1969 |
| CH | 583400 | 12/1976 |
| CH | 671063 | 7/1989 |
| CN | 201635272 | 11/2010 |
| CN | 202025767 | 11/2011 |
| CN | 202577780 | 12/2012 |
| CN | 103774795 | 5/2014 |
| CN | 203951411 | 11/2014 |
| CN | 104254654 | 12/2014 |
| CN | 105208941 | 12/2015 |
| CN | 206628755 | 11/2017 |
| CN | 206717199 | 12/2017 |
| CN | 206737192 | 12/2017 |
| CN | 206849001 | 1/2018 |
| CN | 108086790 | 5/2018 |
| CN | 108105222 | 6/2018 |
| CN | 108331266 | 7/2018 |
| CN | 208986874 | 6/2019 |
| CN | 305195428 | 6/2019 |
| CN | 305231426 | 6/2019 |
| CO | 6511275 | 8/2012 |
| DE | 298762 | 4/1916 |
| DE | 941690 | 4/1956 |
| DE | 2126082 | 12/1972 |
| DE | 2523087 | 11/1976 |
| DE | 2556095 | 6/1977 |
| DE | 3326223 | 4/1984 |
| DE | 3617225 | 11/1987 |
| DE | 3723020 | 1/1989 |
| DE | 3728831 | 1/1989 |
| DE | 9112788 | 12/1991 |
| DE | 4115240 | 10/1992 |
| DE | 10056177 | 5/2002 |
| DE | 10062697 | 7/2002 |
| DE | 10344202 | 4/2004 |
| DE | 202005006951 | 8/2005 |
| DE | 102005002828 | 8/2006 |
| DE | 202006015336 | 12/2006 |
| DE | 202007002252 | 4/2007 |
| DE | 202007002232 | 5/2007 |
| DE | 102007023177 | 3/2008 |
| DE | 202007018367 | 7/2008 |
| DE | 102007036206 | 2/2009 |
| DE | 202009010984 | 12/2009 |
| DE | 102008032985 | 1/2010 |
| DE | 102009035996 | 11/2010 |
| DE | 202010007234 | 10/2011 |
| DE | 202013002857 | 5/2013 |
| DE | 202015102936 | 9/2016 |
| DE | 202012013476 | 2/2017 |
| EP | 0481905 | 4/1992 |
| EP | 0722023 | 7/1996 |
| EP | 0952272 | 10/1999 |
| EP | 1126098 | 8/2001 |
| EP | 1447494 | 8/2004 |
| EP | 1804008 | 7/2007 |

(56) References Cited

FOREIGN PATENT DOCUMENTS

| | | |
|---|---|---|
| EP | 2105971 | 9/2009 |
| EP | 2327942 | 6/2011 |
| EP | 2375185 | 10/2011 |
| EP | 2746695 | 6/2014 |
| EP | 2666925 | 4/2015 |
| EP | 2528166 | 9/2015 |
| EP | 3092350 | 4/2019 |
| EP | 3364124 | 10/2019 |
| EP | 3552307 | 10/2019 |
| EP | 3361183 | 12/2019 |
| EP | 4329192 | 2/2024 |
| FR | 469159 | 7/1914 |
| FR | 1215468 | 4/1960 |
| FR | 2468209 | 4/1981 |
| FR | 2515236 | 4/1983 |
| FR | 2638772 | 5/1990 |
| FR | 2697060 | 4/1994 |
| FR | 2793827 | 11/2000 |
| FR | 2950375 | 3/2011 |
| FR | 2971577 | 8/2012 |
| FR | 2983890 | 6/2013 |
| FR | 2997169 | 4/2014 |
| FR | 3074369 | 12/2019 |
| GB | 2149829 | 6/1985 |
| GB | 2169325 | 7/1986 |
| GB | 2364077 | 1/2002 |
| GB | 2430946 | 4/2007 |
| GB | 2465484 | 5/2010 |
| GB | 2476104 | 6/2011 |
| JP | S56-158486 | 12/1981 |
| JP | H03-166452 | 7/1991 |
| JP | H04-73367 | 3/1992 |
| JP | H04-366294 | 12/1992 |
| JP | H05-346055 | 12/1993 |
| JP | H08-189150 | 7/1996 |
| JP | H09-177272 | 7/1997 |
| JP | H09-256562 | 9/1997 |
| JP | H11-172861 | 6/1999 |
| JP | 2000-120235 | 4/2000 |
| JP | 2000-179106 | 6/2000 |
| JP | 2000-234423 | 8/2000 |
| JP | 2000-303638 | 10/2000 |
| JP | 2001-193231 | 6/2001 |
| JP | 2001-182238 | 7/2001 |
| JP | 2001-303724 | 10/2001 |
| JP | 2002-146978 | 5/2002 |
| JP | 2002-180609 | 6/2002 |
| JP | 2003-096986 | 4/2003 |
| JP | 2003-155803 | 5/2003 |
| JP | 2003-213854 | 7/2003 |
| JP | 2004-060358 | 2/2004 |
| JP | 2004-068270 | 3/2004 |
| JP | 2004-092134 | 3/2004 |
| JP | 2004-116658 | 4/2004 |
| JP | 2004-124583 | 4/2004 |
| JP | 2004-156326 | 6/2004 |
| JP | 2004-264009 | 9/2004 |
| JP | 2004-278145 | 10/2004 |
| JP | 2005-171623 | 6/2005 |
| JP | 2005-322821 | 11/2005 |
| JP | 2006-057357 | 3/2006 |
| JP | 2006-097291 | 4/2006 |
| JP | 2006-144268 | 6/2006 |
| JP | 2009-052278 | 3/2009 |
| JP | 2009-179955 | 8/2009 |
| JP | 2009-185599 | 8/2009 |
| JP | 4381634 | 12/2009 |
| JP | 2010-196422 | 9/2010 |
| JP | 2011-069130 | 4/2011 |
| JP | 2011-185014 | 9/2011 |
| JP | 2011-236611 | 11/2011 |
| JP | 2012-144903 | 8/2012 |
| JP | 2013-083044 | 5/2013 |
| JP | 2013-136892 | 7/2013 |
| JP | 2014-034872 | 2/2014 |
| JP | 2014-047460 | 3/2014 |
| JP | 6033922 | 11/2016 |
| JP | 2018-091009 | 6/2018 |
| JP | 2018-131729 | 8/2018 |
| KR | 100957530 | 5/2010 |
| MX | 2017016056 | 8/2018 |
| NL | 2021378 | 1/2020 |
| NL | 2021379 | 1/2020 |
| NL | 2021380 | 1/2020 |
| NL | 2021740 | 5/2020 |
| PT | 3066398 | 12/2019 |
| PT | 3066399 | 12/2019 |
| WO | WO 96/08617 | 3/1996 |
| WO | WO 96/30606 | 10/1996 |
| WO | WO 97/08399 | 3/1997 |
| WO | WO 99/55982 | 11/1999 |
| WO | WO 01/39331 | 5/2001 |
| WO | WO 03/098126 | 11/2003 |
| WO | WO 2008/021714 | 2/2008 |
| WO | WO 2008/028151 | 3/2008 |
| WO | WO 2010/112049 | 10/2010 |
| WO | WO 2010/113003 | 10/2010 |
| WO | WO 2010/121830 | 10/2010 |
| WO | WO 2010/140878 | 12/2010 |
| WO | WO 2011/019460 | 2/2011 |
| WO | WO 2011/154019 | 12/2011 |
| WO | WO 2012/014203 | 2/2012 |
| WO | WO 2012/017711 | 2/2012 |
| WO | WO 2012/048056 | 4/2012 |
| WO | WO 2012/116121 | 8/2012 |
| WO | WO 2012/116777 | 9/2012 |
| WO | WO 2013/009375 | 1/2013 |
| WO | WO 2013/092428 | 6/2013 |
| WO | WO 2014/194576 | 12/2014 |
| WO | WO 2015/061113 | 4/2015 |
| WO | WO 2016/198305 | 12/2016 |
| WO | WO 2018/169391 | 9/2018 |
| WO | WO 2019/239024 | 12/2019 |
| WO | WO 2020/022879 | 1/2020 |
| WO | WO 2020/022880 | 1/2020 |
| WO | WO 2020/162746 | 8/2020 |
| WO | WO 2020/187472 | 9/2020 |
| WO | WO-2020187472 A1 * | 9/2020 ............ H02S 30/00 |
| WO | WO 2021/043407 | 3/2021 |
| WO | WO 2021/061866 | 4/2021 |
| WO | WO 2021/086185 | 5/2021 |
| WO | WO 2021/102062 | 5/2021 |
| WO | WO 2021/119458 | 6/2021 |
| WO | WO 2022/240909 | 11/2022 |
| WO | WO 2023/028101 | 3/2023 |
| WO | WO 2023/177662 | 9/2023 |
| WO | WO 2023/192199 | 10/2023 |

OTHER PUBLICATIONS

U.S. Appl. No. 14/789,607, filed Jul. 1, 2015 now U.S. Pat. No. 9,732,512.
U.S. Appl. No. 15/471,179, filed Mar. 28, 2017 now U.S. Pat. No. 10,053,856.
U.S. Appl. No. 15/663,081, filed Jul. 28, 2017 now U.S. Pat. No. 10,443,896.
U.S. Appl. No. 16/539,960, filed Aug. 13, 2019 now U.S. Pat. No. 10,859,292.
U.S. Appl. No. 17/110,621, filed Dec. 3, 2020.
U.S. Appl. No. 15/798,023, filed Oct. 30, 2017 now U.S. Pat. No. 10,640,980.
U.S. Appl. No. 16/866,080, filed May 4, 2020 now U.S. Pat. No. 11,085,188.
U.S. Appl. No. 16/360,923, filed Mar. 21, 2019 now U.S. Pat. No. 10,903,785.
U.S. Appl. No. 17/156,469, filed Jan. 22, 2021.
U.S. Appl. No. 16/714,060, filed Dec. 13, 2019 now U.S. Pat. No. 10,948,002.
U.S. Appl. No. 17/199,947, filed Mar. 12, 2021.
U.S. Appl. No. 13/720,461, filed Dec. 19, 2012.
U.S. Appl. No. 15/628,927, filed Jun. 21, 2017 now U.S. Pat. No. 10,634,175.

(56) References Cited

OTHER PUBLICATIONS

U.S. Appl. No. 16/824,651, filed Mar. 19, 2020.
U.S. Appl. No. 12/855,850, filed Aug. 13, 2010 now U.S. Pat. No. 10,054,336.
U.S. Appl. No. 12/856,827, filed Aug. 16, 2010 now U.S. Pat. No. 9,920,958.
U.S. Appl. No. 12/856,844, filed Aug. 16, 2010 now U.S. Pat. No. 8,627,617.
U.S. Appl. No. 16/106,299, filed Aug. 21, 2018 now U.S. Pat. No. 10,502,457.
U.S. Appl. No. 08/285,280, filed Aug. 1, 1994 now U.S. Pat. No. 5,557,903.
U.S. Appl. No. 07/912,845, filed Jul. 13, 1992 now U.S. Pat. No. 5,228,248.
U.S. Appl. No. 08/091,176, filed Jul. 13, 1993 now U.S. Pat. No. 5,483,772.
U.S. Appl. No. 08/482,274, filed Jun. 7, 1995 now U.S. Pat. No. 5,715,640.
U.S. Appl. No. 08/987,368, filed Dec. 9, 1997 now U.S. Pat. No. 5,983,588.
U.S. Appl. No. 09/312,013, filed May 14, 1999 now U.S. Pat. No. 6,164,033.
U.S. Appl. No. 10/118,057, filed Apr. 8, 2002 now U.S. Pat. No. 6,718,718.
U.S. Appl. No. 10/824,320, filed Apr. 13, 2004.
U.S. Appl. No. 08/335,987, filed Nov. 8, 1994 now U.S. Pat. No. 5,694,721.
U.S. Appl. No. 08/336,288, filed Nov. 8, 1994 now U.S. Pat. No. 5,491,931.
U.S. Appl. No. 09/313,105, filed May 17, 1999 now U.S. Pat. No. 6,536,729.
U.S. Appl. No. 09/313,103, filed May 17, 1999 now U.S. Pat. No. 6,470,629.
U.S. Appl. No. 09/758,805, filed Jan. 11, 2001.
U.S. Appl. No. 10/746,546, filed Dec. 23, 2003 now U.S. Pat. No. 7,100,338.
U.S. Appl. No. 10/746,596, filed Dec. 23, 2003 now U.S. Pat. No. 7,013,612.
U.S. Appl. No. 10/818,469, filed Apr. 5, 2004.
U.S. Appl. No. 10/823,410, filed Apr. 13, 2004 now U.S. Pat. No. 7,703,256.
U.S. Appl. No. 12/767,983, filed Apr. 27, 2010.
U.S. Appl. No. 12/960,679, filed Dec. 6, 2010.
U.S. Appl. No. 11/325,704, filed Jan. 5, 2006.
U.S. Appl. No. 11/425,338, filed Jun. 20, 2006.
U.S. Appl. No. 12/707,724, filed Feb. 18, 2010.
U.S. Appl. No. 11/759,172, filed Jun. 6, 2007 now U.S. Pat. No. 7,758,011.
U.S. Appl. No. 12/832,281, filed Jul. 8, 2010 now U.S. Pat. No. 8,430,372.
U.S. Appl. No. 13/857,759, filed Apr. 5, 2013.
U.S. Appl. No. 14/697,387, filed Apr. 27, 2015.
U.S. Appl. No. 12/629,179, filed Dec. 2, 2009.
U.S. Appl. No. 12/542,132, filed Aug. 17, 2009 now U.S. Pat. No. 8,312,678.
U.S. Appl. No. 13/667,816, filed Nov. 2, 2012 now U.S. Pat. No. 8,656,649.
U.S. Appl. No. 14/153,925, filed Jan. 13, 2014 now U.S. Pat. No. 9,222,263.
U.S. Appl. No. 13/403,463, filed Feb. 23, 2012 now U.S. Pat. No. 8,833,714.
U.S. Appl. No. 14/444,405, filed Jul. 28, 2014.
U.S. Appl. No. 14/500,919, filed Sep. 29, 2014 now U.S. Pat. No. 9,611,652.
U.S. Appl. No. 15/452,388, filed Mar. 7, 2017.
U.S. Appl. No. 15/621,092, filed Jun. 13, 2017 now U.S. Pat. No. 10,077,562.
U.S. Appl. No. 15/621,739, filed Jun. 13, 2017 now U.S. Pat. No. 10,106,987.
U.S. Appl. No. 16/129,606, filed Sep. 12, 2018 now U.S. Pat. No. 10,731,355.
U.S. Appl. No. 16/592,521, filed Oct. 3, 2019 now U.S. Pat. No. 11,035,126.
U.S. Appl. No. 17/347,291, filed Jun. 14, 2021.
U.S. Appl. No. 14/030,615, filed Sep. 18, 2013.
U.S. Appl. No. 14/005,784, filed Jun. 13, 2014 now U.S. Pat. No. 9,530,916.
U.S. Appl. No. 15/386,911, filed Dec. 21, 2016.
U.S. Appl. No. 14/205,613, filed Mar. 12, 2014 now U.S. Pat. No. 9,147,785.
U.S. Appl. No. 14/840,206, filed Aug. 31, 2015 now U.S. Pat. No. 9,608,559.
U.S. Appl. No. 15/470,533, filed Mar. 27, 2017 now U.S. Pat. No. 10,103,682.
U.S. Appl. No. 16/139,853, filed Sep. 24, 2018.
U.S. Appl. No. 16/754,519, filed Apr. 8, 2020.
U.S. Appl. No. 10/810,114, filed Mar. 25, 2004 now U.S. Pat. No. 7,513,080.
U.S. Appl. No. 13/545,808, filed Jul. 10, 2012.
U.S. Appl. No. 13/724,976, filed Dec. 21, 2012 now U.S. Pat. No. 9,086,185.
U.S. Appl. No. 14/789,714, filed Jul. 1, 2015.
U.S. Appl. No. 13/712,474, filed Dec. 12, 2012 now U.S. Pat. No. 8,844,234.
Serial No. 14/469, 153 filed Aug. 26, 2014.
U.S. Appl. No. 13/965,441, filed Aug. 13, 2013 now U.S. Pat. No. 8,925,263.
U.S. Appl. No. 14/558,356, filed Dec. 2, 2014 now U.S. Pat. No. 9,306,490.
U.S. Appl. No. 16/821,885, filed Mar. 17, 2020 now U.S. Pat. No. 11,041,310.
U.S. Appl. No. 17/353,483, filed Jun. 21, 2021.
U.S. Appl. No. 17/203,481, filed Mar. 16, 2021.
U.S. Appl. No. 17/203,483, filed Mar. 16, 2021.
"Aerocompact® Compactmetal TR Checklist," Aerocompact, Aug. 30, 2021, CL TR ENG EU V1, 2 pages [retrieved online from: cdn.intelligencebank.com/eu/share/8MnR/YJMd/ZBPL4/original/ AEROCOMPACT_CL_TR_ENG_V1_WEB].
"Aerocompact® Compactmetal TR, " Aerocompact, Sep. 2, 2021, PB TR ENG EU V1, 3 pages [retrieved online from: cdn. intelligencebank.com/eu/share/8MnR/qMBXP/VYrWa/original/ AEROCOMPACT_Leaflet_TR_ENG_V1_WEB].
"CompactMETAL TR59 | TR74 Assembly Instructions," Aerocompact, Sep. 2021, 27 pages.
"Grounding Clip for Electrical Protection," ARaymond, 2016, 2 pages.
"Installation Instructions for Rayvolt®—Grounding clip for Framed PV Modules," ARaymond, Feb. 2016, Version 2.2, 1 page.
"Code: The SR-EC-010," Lockseam Ltd., Received Nov. 9, 2022, Datasheet SR-EC-010 Version 2.0, 6 pages.
"EZ Grip Metal Deck Mount," SunModo Corp., 2019, 1 page.
"EZ Grip Metal Deck Mount," SunModo Corp., 2019, Product page, 3 pages [retrieved online May 30, 2019 from: sunmodo.com/ product/ez-grip-metal-deck-mount/#].
"Fix2000 check list," Schletter GmbH, last updated Jul. 2010, 1 page.
"LM-KS-700," Lumax Energy, 2018, 1 page.
"LM-TBR-VL," Lumax Energy, Oct. 2018, 1 page [retrieved online from: https://lumaxenergy.co.za/wp-content/uploads/2018/12/Lumax-Energy-LM-TBR-VL.pdf/].
"Metal Roof Deck Mount Kit," SunModo Corp., Oct. 16, 2018, Product Drawing, 1 page.
"Non-Penetrative Clamps with Roofs," Clenergy, Dec. 2021, Datasheet, 5 pages.
"PV-ezRack Klip-lok Interface," Clenergy, 2020, 1 page.
"PV-ezRack SolarRoof-Black Anodized," Clenergy, 2020, 4 pages.
"Slot definition," Merriam-Webster Dictionary, 2022, 1 page [retrieved online Aug. 24, 2022 from www.merriam-webster.com/dictionary/ slot].
"Standing Seam Rail Free One Sheet," SunModo, Corp., 2020, 2 pages.

(56) References Cited

OTHER PUBLICATIONS

"Standing Seam RiverClack Clamp," Shanghai Woqin New Energy Technology Co., LTD., 2018, 4 pages [retrieved online on Mar. 23, 2022 from: www.wochnmount.com/Details.html?product_id=36].
"SunDock™ Standing Seam Rail-Free Attachment System," SunModo Corp., 2018, 1 page.
"SunDock Standing Seam PV Mounting System Installation Manual," SunModo, 2019, Doc. No. D10160-V006, 14 pages.
"Universal Klip-lok Interface pre-assembly with Cross Connector Clamp," Clenergy, 2020, 1 page.
"Universal Klip-lok Interface pre-assembly with Tin Interface a with ezClick module," Clenergy, 2020, 1 page.
International Preliminary Report on Patentability for International (PCT) Patent Application No. PCT/US21/40873, dated Jan. 19, 2023 13 pages.
"Ace Clamp Cut Sheet | 5031 Z1-2," Ace Clamp, Nov. 2018, 1 page.
"ADJ Heavy Duty Lighting C-clamp," Sweetwater, 2011, 3 pages [retrieved online from: http://web.archive.org/web/20111112045516/http://www.sweetwater.com/store/detail/CClamp/].
"Aluminum," Wikipedia, Jul. 3, 2016, 21 pages [retrieved Oct. 3, 2017 from: en.wikipedia.org/w1ki/Aluminium].
"ClampFit-H Product Sheet," Schletter GmbH, Kirchdorf, Germany, Nov. 2015, 2 pages.
"ERK-TRB-C16 RiverClack Roofing Profile Interface," Enerack, 2021, 2 pages [retrieved online from: www.enerack.com/erk-trb-c16-riverclack-roofing-profile-interface-p00231p1.html].
IDEEMATEC Tracking & Mounting Systems [online], Apr. 2008, [retrieved Mar. 6, 2012], Retrieved from http://www.ideematec.de.
"Kee Walk—Roof Top Walkway," Simplified Safety, 2011, 3 pages [retrieved online from: https://web.archive.org/web/20120207115154/http://simplifiedsafety.com/solutions/keewalk-rooftop-walkway/].
"KeeLine® The Safety Solution for Horizontal Life Lines," Kee Safety, Ltd. 2012, 2 pages [retrieved online from: https://web.archive.org/web/20120305120830/http://keesafety.co.uk/products/kee_line].
"Miller Fusion Roof Anchor Post," Miller Fall Protection, 2011, 3 pages [retrieved online from: https://web.archive.org/web/20111211154954/www.millerfallprotection.com/fall-protection-products/roofing-products/miller-fusion-roof-anchor-post].
"New 'Alzone 360 system", Arrid, 2008, 34 pages [retrieved online from: https://web.archive.org/web/20120317120735/www.arrid.com.au/?act=racking_parts].
"Oil Canning—Solutions," Pac-Clad, 2001, 2 pages [retrieved online from: pac-clad.com/aiapresentation/sld021.htm].
"Oil Canning," Metal Construction Association, 2003, Technical Bulletin #95-1060, 2 pages.
"REES-Snow Retention Systems," Weerbewind, 2010, 3 pages [retrieved online from: https://web.archive.org/web/20100310075027/www.rees-oberstdorf.de/en/products/snow-retention-system.html].
"S-5! WindClamp™ Install," Metal Roof Innovations, Ltd., 2014, 1 page.
"Solar mount. System," Schletter GmbH, 2012, 1 page [retrieved online from: https://web.archive.org/web/20120316154604/www.schletter.de/152-1-Solar-mounting-systems.html].
"Wiley Grounding & Bonding Solutions," Hubbell, 2020, 2 pages [retrieved online from: www.hubbell.com/wiley/en/grounding-and-bonding].
"Universal Clamps Brochure for Web," Universal Clamps, 2020, 2 pages.
"Wind Clamps for Metal Roofs," Metal Roof Innovations, Ltd., 2017, Version 081717, 2 pages.
"Wind Clamp Ultra DEK," Metal Roof Innovations, Ltd., Mar. 7, 2011, Drawing No. WC14-A-0-A_CCD, 1 page.
"Wind Clamp Double LOK," Metal Roof Innovations, Ltd., Mar. 7, 2011, Drawing No. WC15-A-0-a_ccd, 1 page.
Gallo "Oil-Canning," Metal Roofing Alliance, Ask-the-experts forum, Jun. 7, 2005, 4 pages [retrieved online from: www.metalroofingalliance.net/v2/forums/printview.cfm?action=mboard.members/viewmessages& ForumTopicID=4921&ForumCategoryID=1].
Haddock "History and Materials," Metalmag, Metal roofing from A (Aluminum) to Z (Zinc)—Part I, Sep./Oct. 2001, 4 pages.
Haddock "Metallic Coatings for Carbon Steel," Metalmag, Metal roofing from a (Aluminum) to Z (Zinc)—Part II, Nov./Dec. 2001, 8 pages.
International Search Report and Written Opinion for International (PCT) Patent Application No. PCT/US21/40873, dated Dec. 27, 2021 18 pages.
U.S. Appl. No. 18/780,112, filed Jul. 22, 2024.
U.S. Appl. No. 18,690,529, filed Mar. 8, 2024.
U.S. Appl. No. 18/634,432, filed Apr. 12, 2024.
U.S. Appl. No. 29/911,242, filed Aug. 30, 2023.
U.S. Appl. No. 18/347,812, filed Jul. 6, 2023.
U.S. Appl. No. 29/909,779, filed Aug. 10, 2023.
U.S. Appl. No. 18/798,389, filed Aug. 8, 2024.
U.S. Appl. No. 29/911,713, filed Sep. 7, 2023.
"6 Pcs Solar Panel Mid Clamps, Aluminum Solar Panel Brackets Roof Solar Mid Clamp Mounting Accessories Solar Mid Clamp for Solar Panel Mounting," Amazon, Feb. 14, 2023, 6 pages [retrieved online Mar. 27, 2024 from: tinyurl.com/45tunvth].
"MLPE Mount," Unirac, Dec. 2016, 1 page.
"ProteaBracket ™ Brochure," Metal Roof Innovations, Ltd., 2019, 2 pages.
"ProteaBracket™ Install Instructions," Metal Roof Innovations, Ltd., 2022, 2 pages.
"Rail System," Pegasus Solar, 2021, 2 pages.
"Renusol 420082 Mid Clamp (G)," TradeSparky, 2024, 6 pages [retrieved online Mar. 27, 24 from: www.tradesparky.com/solarsparky/mounting/reusol/mids/renusol-420082-mid-clamp-g].
"Standing Seam Metal Roof Solar Clamps," Mibet Energy, 2021, 13 pages [retrieved online Mar. 27, 2024 from: www.mbt-energy.com/products/roof-pv/list-1.html].
"QRail® System, Installation Manual," Quick Mount PV, Jul. 2019, Rev. 4.2, 48 pages.
Official Action with English Translation for China Patent Application No. 202180056946.8, dated Jun. 13, 2024 24 pages.
Extended Search Report for European Patent Application No. 21837288.6, dated Jun. 19, 2024 9 pages.
Official Action with English Summary for Saudi Arabia Patent Application No. 523442108, dated Sep. 27, 2023 9 pages.
U.S. Appl. No. 08/383,477, filed Feb. 2, 1995, Inventor Robert Haddock, 30 pages.
U.S. Appl. No. 09/698,358, filed Oct. 27, 2000, Inventor Robert Haddock, 74 pages.

\* cited by examiner

MOUNTING SYSTEM, DEVICE, AND METHOD

CROSS-REFERENCE TO RELATED APPLICATIONS

This application claims the benefit of priority under 35 U.S.C. § 119(e) to U.S. Provisional Patent Application No. 63/049,991, filed on Jul. 9, 2020, the entirety of which is incorporated herein by reference.

FIELD OF THE DISCLOSURE

The present disclosure generally relates to a mounting system, device, or method, and more specifically relates to a mounting system, device, or method for securing hardware to roofing and other surfaces of a building that having a standing seam.

BACKGROUND

Metal roofs and other surfaces of buildings can be formed by connecting multiple metal panels together, where the edges of adjacent metal panels are interconnected in a manner that defines a joint or a standing seam. In some configurations, each metal panel has a contoured portion on opposite sides thereof, each of which contoured portions is secured to an elongate clip that is in turn secured to an underlying surface. Each clip is adapted to receive a contoured portion of two adjacent metal panels, one overlaying the other.

One or both of the adjacent metal panels may be secured to the clip with one or more fasteners. The fasteners may, for example, extend through the panel(s) and into the clip. However, use of such fasteners requires one or more holes extending through the metal panel(s), which creates a risk of water seeping through the hole(s) and causing deterioration of the underlying surface. To reduce or minimize this risk, in some embodiments, the underlying panel may be secured to the clip without fasteners, or with one or more fasteners, while the overlaying panel may be configured to cover the one or more fasteners, thus protecting them from at least direct exposure to rain, snow, and other weather events. In such embodiments, the overlaying panels may be secured to the clip via a press or friction fit, a snap fit, or any other attachment method that does not require holes in the corresponding metal panel(s).

One such system is the Riverclack® system marketed and sold by ISCOM SPA, which is shown and described in U.S. Patent Application Publication No. 2016/0130815, entitled "Cover for roofs and the like" and having a filing date of May 9, 2013, the entirety of which is hereby incorporated herein by reference.

Solar panels, HVAC units, water tanks, and other appliances, as well as snow guards and other hardware, are often mounted to roofs and other surface coverings, whether for operational or functional reasons, convenience, safety, or otherwise. Various mounting systems or devices may be used for securing such appliances and/or hardware to standing seam roofs or surface coverings such as those described above.

SUMMARY

The present disclosure is directed to mounting systems and devices configured for use with standing seam roofs and other surface coverings. Mounting systems and devices according to at least some embodiments of the present disclosure are configured to avoid puncturing, denting, or otherwise damaging the metal panels of such coverings, while still firmly gripping the standing seam to help ensure that any appliances or hardware mounted thereto are stable and secure.

A first aspect of the present disclosure is to provide a clamp, comprising: (1) a first component, comprising: (a) a first riser having a top portion, a bottom portion, and a first aperture extending therethrough; (b) a mounting interface extending from the top portion of the first riser, the mounting interface comprising a mounting aperture and having a first end separated from a second end opposite the first end by a first length; and (c) a first foot extending from the bottom portion of the first riser and away from the mounting interface, the first foot having a first heel proximate the bottom portion of the first riser and terminating in a first toe; and (2) a second component, comprising: (i) a second riser having a top portion, a bottom portion, and a second aperture extending therethrough; (ii) a first arm extending from the top portion of the second riser; (iii) a second foot extending from the bottom portion of the second riser and away from the first arm, the second foot having a second heel proximate the bottom portion of the second riser and terminating in a second toe; and (iv) a second arm extending from the second riser in between the second aperture and the second foot.

In some embodiments, the mounting aperture is generally cylindrical. In some embodiments, the mounting aperture is threaded.

Alternatively, in some embodiments, the mounting aperture comprises an elongate slot with a second length.

Optionally, the second length of the elongate slot is less than the first length of the mounting interface. Alternatively, the second length of the elongate slot is equal to the first length.

The clamp of the first aspect may include one or more of the previous embodiments and optionally the mounting interface further comprises a nut retention slot with a third length.

In some embodiments, the third length of the nut retention slot is less than the first length of the mounting interface. Alternatively, third length of the nut retention slot is equal to the first length of the mounting interface.

The clamp of the first aspect may include one or more of the previous embodiments and optionally further comprises a fastener extendable through the first aperture and the second aperture to secure the first component to the second component.

The clamp of the first aspect may include one or more of the previous embodiments and optionally the first arm extends along a first axis that is approximately perpendicular to a first reference plane. Optionally, when the first component is secured to the second component, the first axis is approximately parallel to a second reference plane defined by an upper surface of the top portion.

Optionally, when the first component is secured to the second component, the first arm defines a plane that intersects the first riser between the mounting interface and the first heel.

In some embodiments, the second arm extends along a second axis that is approximately perpendicular to the first reference plane, the second axis approximately parallel to the first axis.

The clamp of the first aspect may include one or more of the previous embodiments and the first arm and the second arm are optionally configured to maintain a predetermined distance between the first riser and the second riser when a fastener is used to secure the first component to the second component.

The clamp of the first aspect may include one or more of the previous embodiments and the first foot optionally comprises one or more of: (a) an upper bridge extending from an exterior surface of the first riser; (b) a knuckle extending from the upper bridge; (c) a lower bridge extending from the knuckle; (d) the first toe extending from the lower bridge; (e) a lower surface extending between the first toe and the first heel and including an arch; and (f) the first heel extending from an interior surface of the first riser.

Optionally, the upper bridge is concave. The upper bridge may be defined by a first radius of curvature.

Additionally, or alternatively, the lower bridge is concave. The lower bridge may be defined by a second radius of curvature that is different than the first radius of curvature.

Optionally, the first radius of curvature is greater than the second radius of curvature.

In some embodiments, the knuckle is convex.

The clamp of the first aspect may include one or more of the previous embodiments and the second foot optionally comprises one or more of: (a) an upper bridge extending from an exterior surface of the second riser; (b) a knuckle extending from the upper bridge; (c) a lower bridge extending from the knuckle; (d) the second toe extending from the lower bridge; (e) a lower surface extending between the second toe and the second heel and including an arch; and (f) the second heel extending from an interior surface of the second riser.

In some embodiments, the clamp of the first aspect includes one or more of the previous embodiments and, when the first component is secured to the second component: (1) the first riser is oriented at a first angle relative to the second reference plane defined by the upper surface of the top portion, the first angle having a first magnitude; and (2) the second riser is oriented at a second angle relative to the second reference plane, the second angle having a second magnitude that is approximately equal to the first magnitude.

Optionally, the clamp of the first aspect includes one or more of the previous embodiments and one or more of the first component and the second component are made of a metal.

In some embodiments, the metal is aluminum or an aluminum alloy.

The clamp of the first aspect may include one or more of the previous embodiments and optionally one of the first aperture and the second aperture is not threaded. In some embodiments, the first aperture is not threaded.

Optionally, one of the second aperture and the first aperture is threaded. In some embodiments, the second aperture is threaded.

A second aspect of the present disclosure is to provide a mounting system for use with a standing seam, comprising: (1) a first side member, comprising: (a) a mounting interface; (b) a first foot; and (c) a first aperture between the mounting interface and the first foot; (2) a second side member, comprising: (i) a first arm with a first end; (ii) a second arm with a second end; (iii) a second aperture between the first and second arms; and (iv) a second foot; and (3) a fastener extendable through the first aperture and the second aperture to secure the first side member to the second side member such that the first and second ends of the arms contact an interior surface of the first side member to provide a predetermined spacing between the first foot and the second foot.

The first side member has a first end and a second end separated from the first end by a first length.

In some embodiments, the first foot is configured to engage a first channel of a first Riverclack® metal panel. Additionally, or alternatively, the second foot is configured to engage a second channel of a second Riverclack® metal panel. Optionally, a slot formed between the first side member and the second side member is configured to receive the standing seam defined by the first Riverclack® metal panel and the second Riverclack® metal panel.

The mounting system of the second aspect may include one or more of the previous embodiments and optionally the first foot comprises a first heel and a first toe, the first toe configured to engage the first channel, and the first heel configured to engage an inset portion of the first Riverclack® metal panel.

In some embodiments the mounting system of the second aspect includes one or more of the previous embodiments and optionally one of the first aperture and the second aperture is not threaded. In at least one embodiment, the first aperture is not threaded.

Additionally, or alternatively, one of the second aperture and the first aperture may be threaded. In some embodiments, the second aperture is threaded.

The mounting system of the second aspect may include one or more of the previous embodiments and optionally a first axis of the first aperture is spaced a first distance from a first toe of the first foot. Additionally, or alternatively, a second axis of the second aperture may be spaced a second distance from a second toe of the second foot. In some embodiments, the second distance is approximately equal to the first distance.

In some embodiments, the mounting system of the second aspect includes one or more of the previous embodiments and further comprises a mounting aperture extending through the mounting interface.

Optionally, the mounting aperture is generally cylindrical. In some embodiments, the mounting aperture is threaded.

Alternatively, in some embodiments, the mounting aperture comprises an elongate slot with a second length.

Optionally, the second length of the elongate slot is less than the first length of the first side member. Alternatively, the second length of the elongate slot is equal to the first length.

The mounting system of the second aspect may include one or more of the previous embodiments and one or more of the first side member and the second side member is formed of a metal. In some embodiments, the metal is aluminum or an aluminum alloy.

In some embodiments, one of the first aperture and the second aperture is not threaded. Optionally, the first aperture is not threaded.

Additionally, or alternatively, one of the second aperture and the first aperture is threaded. In some embodiments, the second aperture is threaded.

The mounting system of the second aspect may include one or more of the previous embodiments optionally further comprises an accessory interconnected to the mounting interface. In some embodiments, the accessory comprises: a mounting plate; a stanchion; a clamp; and a clamping fastener.

In some embodiments, the mounting plate comprising a central hole that is unthreaded. An inner annular projection extends around the central hole. The inner annular projection may extend to a first height above an outer annulus of the mounting plate.

Optionally, an outer annular projection extends around the inner annular projection. In some embodiments, the outer annular projection extends to a second height above the outer annular. Optionally, the second height is less than the first height.

In some embodiments, the stanchion comprises a body with a first threaded hole and a first threaded shaft. The first threaded shaft is sized to extend through the central hole of the mounting plate and into the mounting aperture of the mounting interface to interconnect the stanchion and the mounting plate to the first side member.

The clamp may comprise an upper wall with a first edge and a second edge.

The upper wall has a first surface and a second surface substantially parallel to the first surface.

A central aperture extends through the upper wall. Optionally, the central aperture is unthreaded.

A first sidewall extends from the upper wall proximate to the second surface. In some embodiments, at least a portion of the first sidewall is substantially perpendicular to the second surface.

In some embodiments, the first sidewall is offset from the first edge to define a first clamping section of the clamp.

A second sidewall extends from the upper wall proximate to the second surface. Optionally, at least a portion of the second sidewall substantially perpendicular to the second surface.

The second sidewall may include a slot. The slot may extend from a first end of the second sidewall to a second end of the second sidewall.

In some embodiments, the second sidewall is offset from the second edge to define a second clamping section of the clamp.

A space between interior surfaces of the first and second sidewalls defines a stanchion receptacle Optionally, a clamping fastener comprising a second threaded shaft is extendable through the central aperture of the clamp to engage threads of the first threaded hole of the stanchion.

The mounting system of the second aspect may include one or more of the previous embodiments and optionally the first foot further comprises a first knuckle. The first heel is spaced from the first knuckle by a first distance.

An inset portion of the first Riverclack® metal panel is separated from a bend of the first Riverclack® metal panel by a second distance. In some embodiments, the second distance is less than the first distance.

A third aspect of the present disclosure is to provide a method of connecting a mounting system to a standing seam defined by first and second metal panels, comprising: (1) providing a first component of the mounting system, comprising: (a) a mounting interface; (b) a first foot comprising a first toe and a first heel; and (c) a first aperture between the mounting interface and the first foot; (2) inserting the first toe into a first channel of the first metal panel; (3) positioning the first heel in a first inset portion of the first metal panel; (4) providing a second component of the mounting system, comprising: (i) a first arm with a first end; (ii) a second arm with a second end; (iii) a second aperture between the first and second arms; and (iv) a second foot comprising a second toe and a second heel; (5) inserting the second toe into a second channel of the second metal panel; (6) positioning the second heel in a second inset portion of the second metal panel; and (7) securing the first component to the second component with a fastener that extends through the first and second apertures such that at least one of the first and second ends of the arms of the second component engage an interior surface of the first component.

In some embodiments, the mounting system is the mounting system of the second aspect. Additionally, or alternatively, the mounting system may comprise the clamp according to the first aspect of the present disclosure.

The method of the third aspect may comprise one or more of the previous embodiments and optionally further comprises mounting an accessory to the mounting system by extending a fastener through a mounting aperture of the mounting interface.

Optionally, at least one of the first and second apertures is threaded.

The method of the third aspect optionally includes one or more of the previous embodiments and optionally the first foot further comprises a first knuckle. The first heel is spaced from the first knuckle by a first distance. The first metal panel may include an inset portion that is spaced from a bend of the first metal panel by a second distance. In some embodiments, the second distance is less than the first distance.

A fourth aspect of the present disclosure is to provide a method of making a clamp, comprising: (1) extruding a first component of the clamp, the first component comprising: (a) a mounting interface; (b) a first sidewall extending away from the mounting interface; and (c) a first foot extending away from the first sidewall; (2) cutting the first component to a first length to define a first end and a second end of the clamp; (3) creating a first aperture through the first component; (4) extruding a second component of the clamp, the second component comprising: (i) a first arm; (ii) a second arm oriented approximately parallel to the first arm; (iii) a second sidewall extending away from the second arm; and (iv) a second foot extending away from the second sidewall; (5) cutting the second component to a second length approximately equal to the first length; and (6) creating a second aperture through the second component, the second aperture positioned between the first and second arms.

Optionally, the method of the fourth aspect comprises forming threads in at least one of the first and second apertures.

The method of the fourth aspect optionally includes forming a mounting aperture through the mounting interface.

In some embodiments, the mounting aperture is an elongated slot.

Optionally, the mounting aperture has a slot length that is less than the first length.

Additionally, or alternatively, the mounting aperture optionally extends to at least one of the first end and the second end of the clamp.

The method of the fourth aspect may include one or more of the previous embodiments, and optionally the mounting interface comprises a nut retention slot. The nut retention slot comprises a first slot portion with a first width and a second slot portion with a second width that is less than the first width.

A fifth aspect of the present disclosure is to provide a device for mounting an object to a standing seam, comprising: (1) a mounting interface comprising an upper surface; (2) a first foot comprising a first heel and a first toe; (3) a second foot comprising a second heel and a second toe; (4) a first sidewall having a first aperture and extending from the mounting interface to the first foot; (5) a second sidewall having a second aperture and extending from a first arm to the second foot; and (6) a fastener for securing the first sidewall to the second sidewall via the first aperture and the second aperture.

Optionally, the first and second heels point toward each other when the first and second sidewalls are secured together.

In some embodiments, the device further comprises a second arm extending from the second sidewall substantially parallel to the first arm.

The device of the fifth aspect may include one or more of the previous embodiments and optionally the device further comprises a slot to receive the standing seam. The slot is defined by the first and second feet, a portion of the first sidewall, a portion of the second sidewall, and the second arm.

In some embodiments, the mounting interface further comprises a nut retention slot extending parallel to the upper surface.

The device of the fifth aspect may include one or more of the previous embodiments and optionally the device further a mounting aperture extending through the upper surface and intersecting the nut retention slot.

In some embodiments, the mounting aperture comprises an elongate slot having a first length.

Optionally, the nut retention slot has a second length greater than the first length.

The device of the fifth aspect may include one or more of the previous embodiments and optionally each foot further comprises an arch between the heel and the toe, the arch being concave.

In some embodiments, when the first and second sidewalls are secured together by the fastener: (1) an interior surface of the first sidewall is oriented at a first oblique angle relative to the upper surface of the mounting interface; and (2) an interior surface of the second sidewall is oriented at a second oblique angle relative to the upper surface of the mounting interface.

Optionally, the first oblique angle has a first magnitude and the second oblique angle has a second magnitude approximately equal to the first magnitude.

A mounting system according to at least one embodiment of the present disclosure comprises a first component and a second component. The first component comprises a first riser having a top portion, a bottom portion, and a first aperture extending therethrough; a mounting interface extending from the top portion of the first riser, the mounting interface comprising a mounting aperture and having a first end separated from a second end opposite the first end by a first length; and a first foot extending from the bottom portion of the first riser and away from the mounting interface, the first foot having a first heel proximate the first riser and terminating in a first toe. The second component comprises a second riser having a top portion, a bottom portion, and a second aperture extending therethrough; a first arm extending from the top portion of the second riser; a second foot extending from the bottom portion of the second riser and away from the first arm, the second foot having a second heel proximate the second riser and terminating in a second toe; and a second arm extending from the second riser in between the second aperture and the second foot.

The mounting aperture may comprise an elongate slot having a second length less than the first length. The mounting interface may further comprise a nut retention slot extending from the first end to the second end. The first arm may be substantially parallel to the second arm. A fastener may extend through the first aperture and the second aperture to secure the first component to the second component. When the first component is secured to the second component, the first arm may define a plane that intersects the first riser between the mounting interface and the first heel.

The first arm and the second arm may be configured to maintain a predetermined distance between the first riser and the second riser when the fastener is used to secure the first component to the second component. The first foot may extend away from the second riser and the second foot may extend away from the first riser. The first foot may comprise a first arch and the second foot may comprise a second arch. The first riser may comprise a first planar portion substantially perpendicular to an upper surface of the mounting interface, and a second planar portion that is angled relative to the first planar portion.

A device for mounting an object to a standing seam according to at least another embodiment of the present disclosure comprises: a mounting interface comprising an upper surface; a pair of feet, each foot comprising a heel and a toe; a first sidewall having a first aperture and extending from the mounting interface to a first one of the pair of feet; a second sidewall having a second aperture and extending from a first arm to a second one of the pair of feet; and a fastener for securing the first sidewall to the second sidewall via the first aperture and the second aperture.

The heels of the pair of feet may point toward each other. The device may further comprise a second arm extending from the second sidewall substantially parallel to the first arm. The device may further comprise a standing seam slot defined by the pair of feet, a portion of the first sidewall, a portion of the second sidewall, and the second arm. The mounting interface may further comprise a mounting aperture extending through the upper surface and a nut retention slot extending parallel to the upper surface. The mounting aperture may comprise an elongate slot having a first length, and the nut retention slot may comprise a second length greater than the first length. Each foot further may further comprise an arch between the heel and the toe.

A mounting system for use with standing seams according to at least another embodiment of the present disclosure generally comprises: a first side member comprising a mounting interface, a first foot, and a first aperture; a second side member comprising a first spacing arm, a second spacing arm, a second foot and a second aperture; and a fastener engaging the first aperture and the second aperture to secure the first side member to the second side member. The first spacing arm and the second spacing arm ensure at least a minimum spacing between the first foot and the second foot.

The first foot may be configured to engage a first channel of a first Riverclack® metal panel. The second foot may be configured to engage a second channel of a second Riverclack® metal panel. A slot formed between the first side member and the second side member may be configured to receive a standing seam between the first Riverclack® metal panel and the second Riverclack® metal panel. The first foot may comprise a first heel and a first toe. The first toe may be configured to engage the first channel, and the first heel may be configured to engage an inset portion of the first Riverclack® metal panel.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together. When each one of A, B, and C in the above expressions refers to an element, such as X, Y, and Z, or class of elements, such as X1-Xn, Y1-Ym, and Z1-Zo, the phrase is intended to refer to a single element selected from X, Y, and Z, a combination of elements selected from the same class (e.g., X1 and X2) as well as a combination of elements selected from two or more classes (e.g., Y1 and Zo).

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

Unless otherwise indicated, all numbers expressing quantities, dimensions, conditions, ratios, ranges, and so forth used in the specification and claims are to be understood as being modified in all instances by the term "about" or "approximately". Accordingly, unless otherwise indicated, all numbers expressing quantities, dimensions, conditions, ratios, ranges, angles, relationships and so forth used in the specification and claims may be increased or decreased by approximately 10% to achieve satisfactory results. Additionally, where the meaning of the terms "about" or "approximately" as used herein would not otherwise be apparent to one of ordinary skill in the art, the terms "about" and "approximately" should be interpreted as meaning within plus or minus 10% of the stated value.

The term "parallel" means two objects are oriented at an angle within plus or minus 0° to 5° unless otherwise indicated. Similarly, the term "perpendicular" means two objects are oriented at angle of from 85° to 95° unless otherwise indicated.

All ranges described herein may be reduced to any sub-range or portion of the range, or to any value within the range without deviating from the invention. For example, the range "5 to 55" includes, but is not limited to, the sub-ranges "5 to 20" as well as "17 to 54."

The preceding is a simplified summary of the disclosure to provide an understanding of some aspects of the disclosure. This summary is neither an extensive nor exhaustive overview of the disclosure and its various aspects, embodiments, and configurations. It is intended neither to identify key or critical elements of the disclosure nor to delineate the scope of the disclosure but to present selected concepts of the disclosure in a simplified form as an introduction to the more detailed description presented below. As will be appreciated, other aspects, embodiments, and configurations of the disclosure are possible utilizing, alone or in combination, one or more of the features set forth above or described in detail below.

BRIEF DESCRIPTION OF THE FIGURES

The accompanying drawings are incorporated into and form a part of the specification to illustrate several examples of the present disclosure. The drawings are not to be construed as limiting the disclosure to only the illustrated and described examples.

Figure 1:
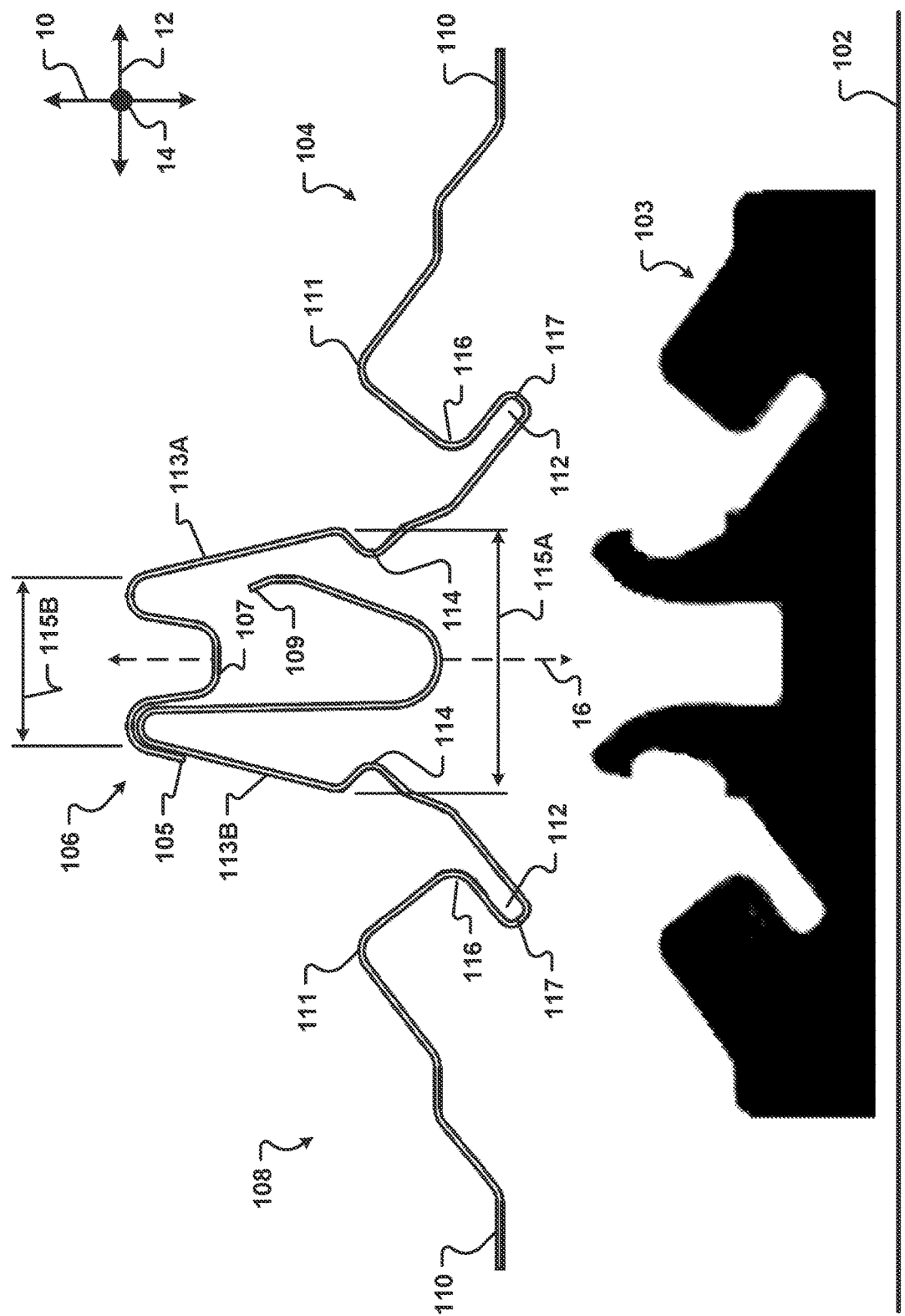
FIG. 1 is a front elevation view of a standing seam defined by two metal panels and a clip for fixing the metal panels to a building surface.

The following is a listing of components according to various embodiments of the present disclosure, and as shown in the drawings:

| Number | Component |
| --- | --- |
| 10 | Vertical dimension |
| 12 | Lateral dimension |
| 14 | Longitudinal dimension |
| 16 | Reference plane |
| 100 | Mounting system |
| 102 | Building surface |
| 103 | Clip |
| 104 | Metal panel |
| 105 | Free end |
| 106 | Standing seam |
| 107 | Concave portion |
| 108 | Metal panel |
| 109 | Free end |
| 110 | Base |
| 111 | Protrusion |
| 112 | Channel |
| 113 | Sidewalls of standing seam |
| 114 | Inset portion |
| 115A | Maximum width of standing seam |
| 115B | Minimum width of standing seam |
| 116 | Bend of metal panel |
| 117 | Turn |
| 118 | Clamp |
| 120 | First component |
| 121A | First end of first component |
| 121B | Second end of first component |
| 122 | First aperture |
| 123 | Axis of first aperture |
| 124 | Second component |
| 125A | First end of second component |
| 125B | Second end of second component |
| 126 | Second aperture |
| 127 | Axis of second aperture |
| 128 | First riser |
| 129 | Lower portion of first riser |
| 130 | Nut retention slot |
| 132 | Second riser |
| 133 | Lower portion of second riser |
| 134 | Flanged nut or fastener |
| 135 | Body of flanged nut |
| 136 | Mounting interface |
| 137 | Flange of flanged nut |
| 138 | Upper wall |
| 139 | Angle between lower portion of second riser and reference plane |
| 140 | Upper surface |
| 142 | Lower surface |
| 144 | First side portion |
| 146 | Upper portion of first riser |
| 147 | Angle between lower portion of first riser and reference plane |
| 148 | First shoulder or protrusion |
| 152 | Upper slot portion |
| 153 | Slot sidewalls |
| 154 | Slot lower walls |

-continued

| Number | Component |
|---|---|
| 156 | Lower slot portion |
| 160 | Second shoulder |
| 164 | Second side portion |
| 168 | First foot |
| 169A | Outer surface of first component |
| 169B | Inner surface of first component |
| 170 | Second foot |
| 171A | Outer surface of second component |
| 171B | Inner surface of second component |
| 172 | Heel |
| 173 | Sole of foot |
| 174 | Front of sole |
| 175 | Angle of front portion |
| 176 | Arch |
| 180 | Upper bridge |
| 181 | Width between bends of panels |
| 182 | Slot |
| 183A | First width (or maximum width) of slot |
| 183B | Slot local minimum width |
| 184 | Knuckle |
| 186 | Distance between heel and knuckle |
| 188 | Lower bridge |
| 190 | Bolt |
| 191 | Shaft |
| 192 | Toe |
| 194 | Upper portion or spacer of second component |
| 195 | Accessory |
| 196 | First arm |
| 197 | First end of first arm |
| 198 | Second arm |
| 199 | Second end of second arm |
| 200 | First length of first arm |
| 201 | First axis |
| 202 | Second length of second arm |
| 203 | Second axis |
| 204 | Length of mounting system |
| 208 | Length of mounting aperture |
| 212 | Width of mounting aperture |
| 216 | Mounting aperture |
| 216A | Circular mounting aperture |
| 216B | Elongated slot mounting aperture |
| 217 | Slot end |
| 218 | Mounting fastener |
| 220 | First height of first component |
| 222 | Second height of second component |
| 224 | Distance of first aperture axis from toe |
| 226 | Distance of second aperture axis from toe |
| 228 | Depression |
| 240 | Mounting plate |
| 242 | Central aperture |
| 244 | Inner annular projection |
| 246 | Outer annular projection |
| 248 | Grounding projections |
| 250 | Stanchion |
| 252 | Body portion |
| 254 | First threaded hole |
| 256 | First threaded shaft |
| 258 | PV Clamp |
| 260 | Upper wall |
| 262 | Aperture |
| 264 | First surface |
| 266 | Second surface |
| 268 | First edge |
| 270 | Second edge |
| 272 | First sidewall |
| 274 | Second sidewall |
| 276 | First clamping section |
| 278 | Second clamping section |
| 280 | Channel |
| 282 | Stanchion receptacle |
| 284 | Clamping fastener |
| 286 | Threaded shaft |
| 300 | Method |
| 304 | Insert first component into first metal panel |
| 308 | Insert second component into second metal panel |

-continued

| Number | Component |
|---|---|
| 312 | Secure first component to second component |
| 316 | Optionally mount an accessory to the mounting system |

DETAILED DESCRIPTION

Before any embodiments of the disclosure are explained in detail, it is to be understood that the disclosure is not limited in its application to the details of construction and the arrangement of components set forth in the following description or illustrated in the figures. The disclosure is capable of other embodiments and of being practiced or of being carried out in various ways. As will be appreciated, other embodiments are possible using, alone or in combination, one or more of the features set forth above or described below. For example, it is contemplated that various features and devices shown and/or described with respect to one aspect, embodiment or figure may be combined with or substituted for features or devices of other aspects, embodiments or figures regardless of whether or not such a combination or substitution is specifically shown or described herein. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Further, the present disclosure may use examples to illustrate one or more aspects thereof. Unless explicitly stated otherwise, the use or listing of one or more examples (which may be denoted by "for example," "by way of example," "e.g.," "such as," or similar language) is not intended to and does not limit the scope of the present disclosure. The use of "mounting device" and "clamp" can be interchangeable herein.

Unless specified otherwise, the use of directional terms herein (e.g., upper, lower, above, below, top, bottom) are used to describe a position of one or more aspects of a mounting system or device described herein relative to another one or more aspects of the mounting system or device (e.g., using a coordinate system that is defined by the system or device), and is not intended, nor should be interpreted, to refer to directions relative to any coordinate system independent of the mounting system or device.

Referring now to FIG. 1, two prior art Riverclack® metal panels 104 and 108 are generally illustrated joined together to form a standing seam 106. The standing seam is approximately bisected by a reference plane 16. The reference plane is defined by a vertical dimension 10 that is orthogonal to a longitudinal dimension 14.

Each of the metal panels 104, 108 generally includes a base 110 that extends in a lateral dimension 12 inwardly toward the reference plane 16 to a protrusion 111. The protrusion 111 extends above the base in the vertical dimension 10 that is orthogonal to the lateral dimension 12.

The panels extend from the protrusion 111 downwardly in the vertical dimension and toward the reference plane to a bend 116. The bend 116 is defined by a turn of approximately 90° away from the reference plane 16.

After the bend 116, the panels 104, 108 extend away from the reference plane 16 to a turn 117. The turns extend through about 180° and define a channel 112 for each panel. From the turn 117, the panels 104, 108 continue upwardly in the vertical dimension 10 toward the reference plane 16 to an inset portion 114. The inset portion 114 is defined by a turn of the panels 104, 108 of approximately 90° away from the reference plane 16. The inset portion 114 of each panel has first radius of curvature.

Each panel has a sidewall 113 extending upwardly from an upper end of the inset portion 114. The standing seam 106 has a maximum width 115A measured in the lateral dimension 12 at a point between the inset portions 114 and lower ends of the sidewalls 113.

The sidewalls 113 are generally planar and oriented at an oblique angle to the reference plane 16. Accordingly, the standing seam 106 has a minimum width 115B at the upper ends of the sidewalls that is less than the maximum width 115A. In some embodiments, the sidewalls 113 are each oriented at an angle of about 13° relative to the reference plane 16.

The metal panel 108 continues from its sidewall 113B past the reference plane 16 to a free end 109 which is positioned within the standing seam 106. Similarly, metal panel 104 continues from its sidewall 113A past the reference plane to a free end 105. However, free end 105 of the metal panel 104 is positioned outside of the standing seam 106 and proximate to an exterior surface of the sidewall 113B of the metal panel 108. Between the free end 105 and the sidewall 113A, the metal panel 104 may include a channel or concave portion 107 that defines an upper surface of the standing seam 106.

The metal panels 104, 108 are configured to engage a clip 103 that is secured to a building surface 102. For example, projections of the panels formed by the channels 112 and turns 117 may fit into corresponding slots of the clip. The clip 103 may be secured to the building surface 102 in any orientation by a suitable manner known to those of skill in the art. Although the building surface 102 is illustrated as being generally horizontal, the building surface may be oriented approximately vertically to define a wall or other surface of a building.

Referring now to FIGS. 2A-2H, a mounting system 100 of embodiments of the present disclosure comprises a clamp 118 with a first component 120 and a second component 124. The first component 120 may also be described, for example, as a first sidewall, a first side member, a first piece, or a first member. The second component 124 may also be described, for example, as a second sidewall, a second side member, a second piece, or a second member.

Figure 2A:
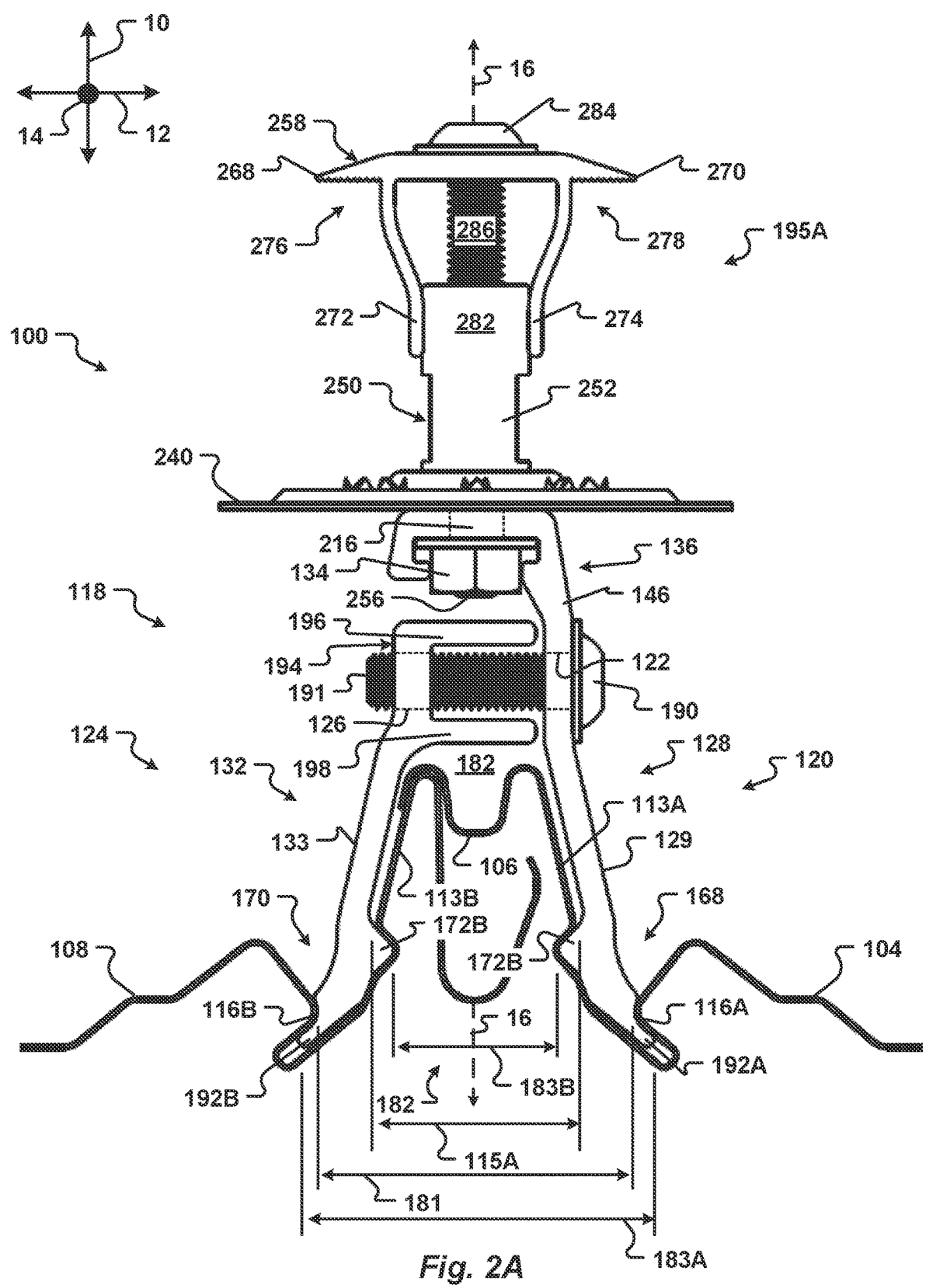
FIG. 2A is a front elevation view of a mounting system including a clamp according to at least one embodiment of the present disclosure, the clamp having an accessory mounted thereto.
Figure 2B:
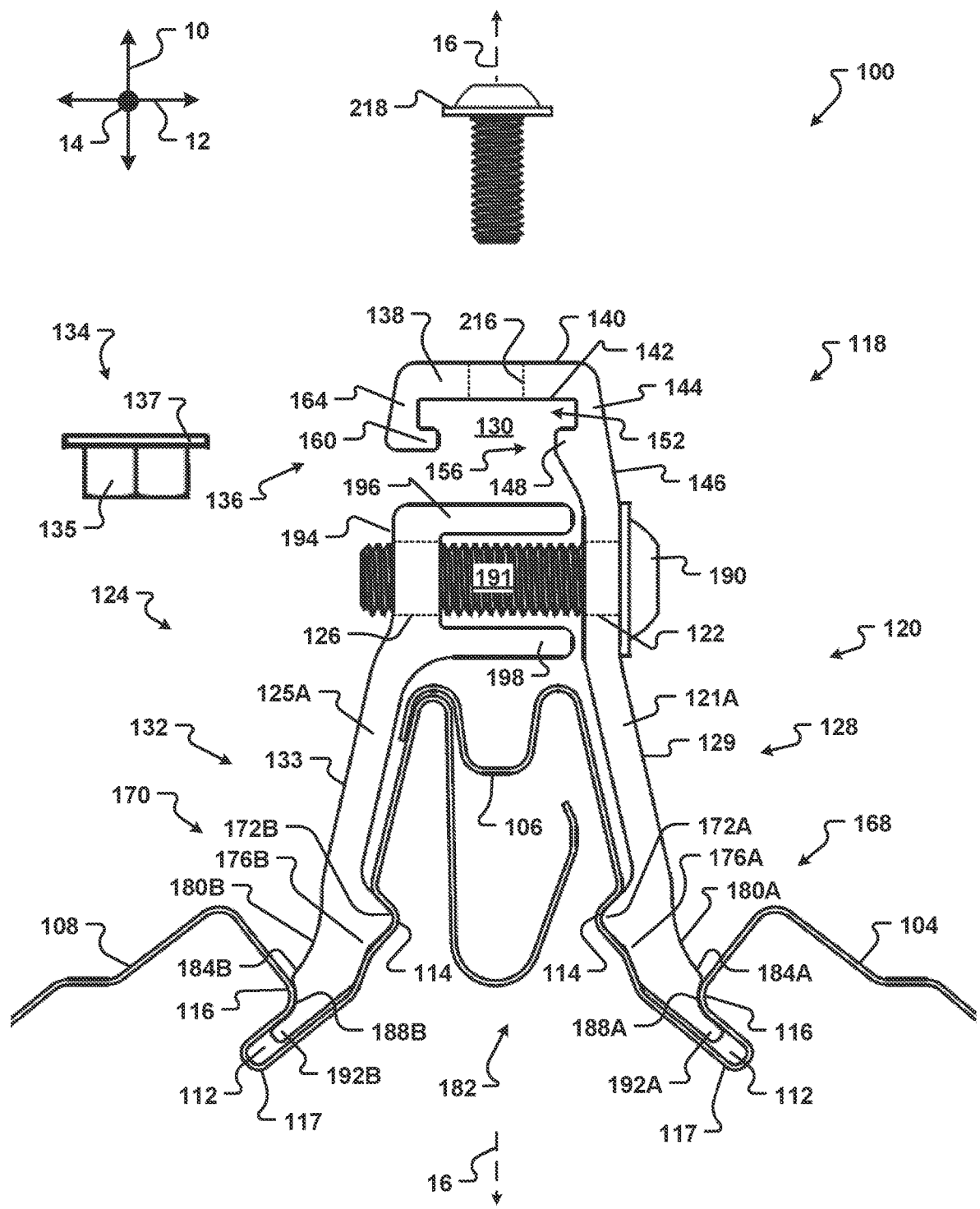
FIG. 2B is another front elevation view of the clamp of FIG. 2A, without the accessory mounted thereto.
Figure 2C:
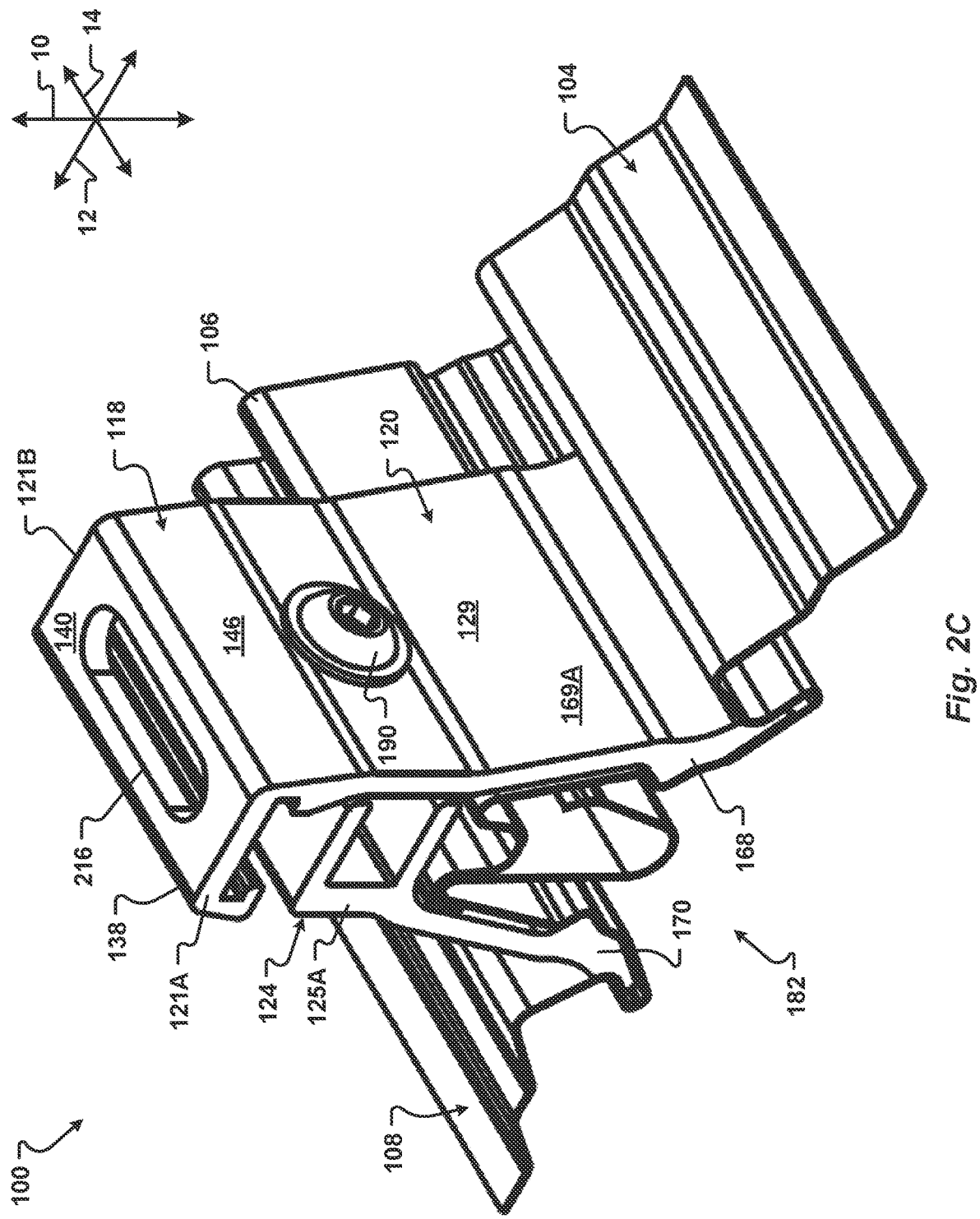
FIG. 2C is a perspective view of the clamp of FIG. 2B engaged to a standing seam defined by two metal panels.

The mounting system 100 is used to secure an accessory such as the accessory 195 to a standing seam where two metal panels are joined together, such as the standing seam 106 between the metal panels 104 and 108. More specifically, in embodiments, the mounting system 100 is configured for use with standing seams formed between first and second Riverclack® metal panels 104, 108, as illustrated in FIGS. 2A-2C.

The clamp 118 may be formed of any appropriate material. In some embodiments, the first and second components 120, 124 are formed of a metal (e.g., aluminum or an aluminum alloy). The first component 120 and the second component 124 may be described as being rigid with little or no relative movement between portions of the first and second components.

In some embodiments, the clamp 118 and its first and second components are configured to be simple to manufacture to reduce costs. Moreover, in embodiments, the dimensions of the clamp and its first and second components are minimized to limit material requirements and manufacturing costs.

Optionally, the first component 120 is integrally formed of one-piece of material (i.e., the first component is of an integral construction with no joints of any kind). Additionally, or alternatively, the second component 124 may also be integrally formed of one-piece of material such that the second component can be described as having an integral construction with no joints of any kind. Accordingly, the first and second components may each be described as being of a unitary construction.

In some embodiments, one or more of the first the second component are formed by an extrusion process. For example, the first and second components may be formed as an extrusion and subsequently cut to a desired length. Apertures 122, 216 may then be formed through the first component. Similarly, aperture 126 may be formed through the second component.

Figure 2D:
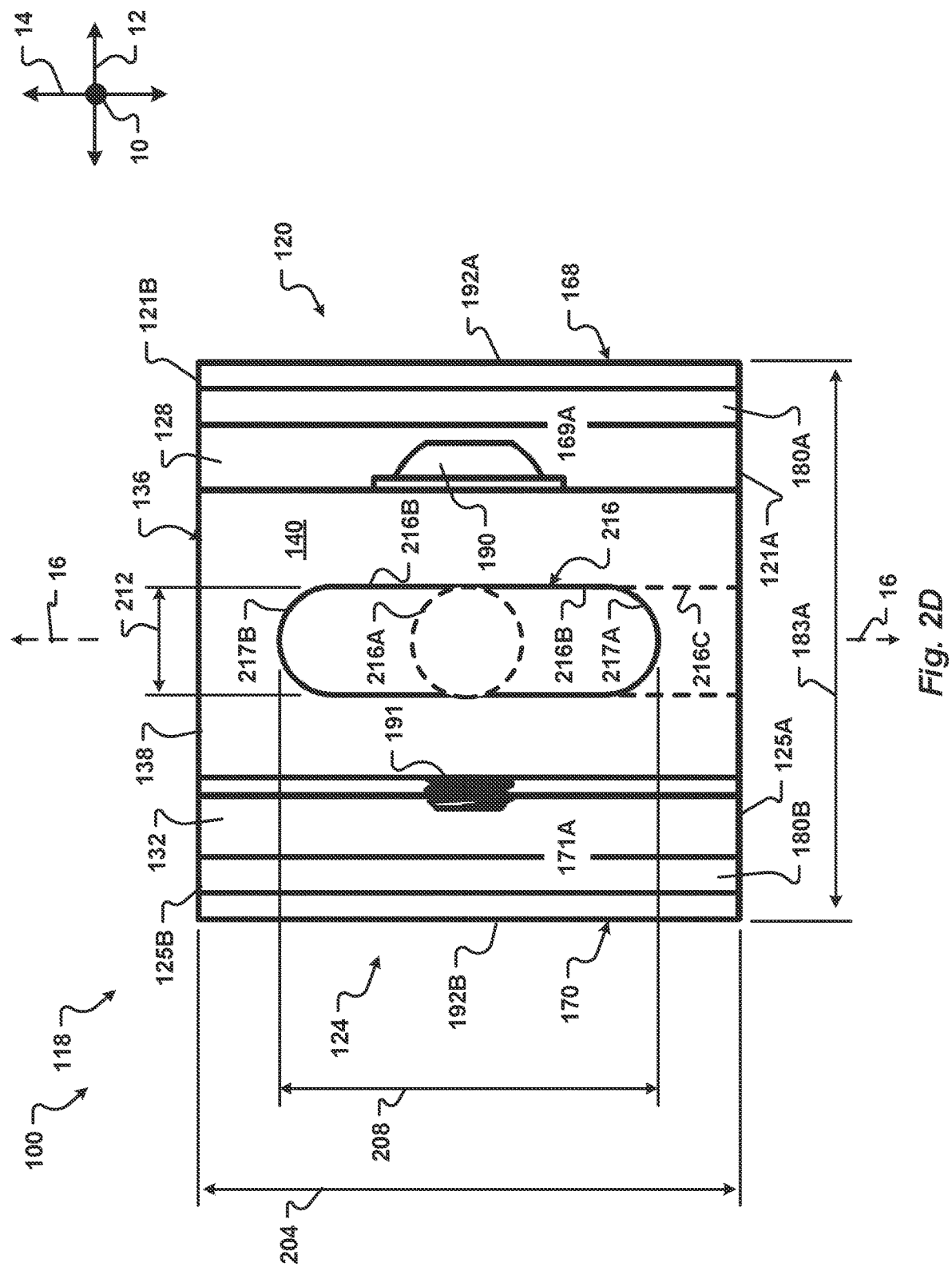
FIG. 2D is a top plan view of the clamp of FIG. 2B, according to at least one embodiment of the present disclosure.
Figure 2E:
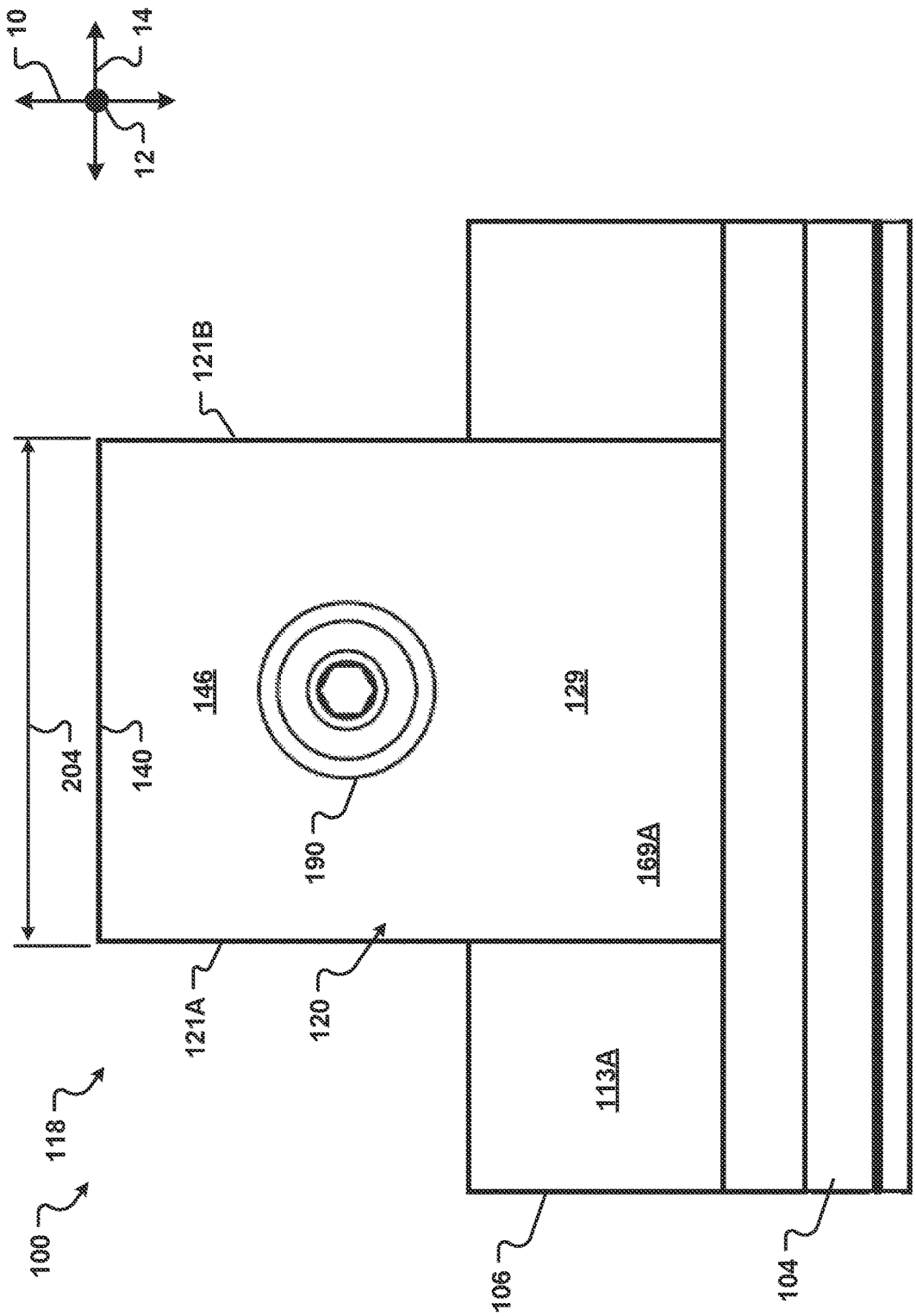
FIG. 2E is a side elevation view of the clamp and a metal panel of FIG. 2B.
Figure 2F:
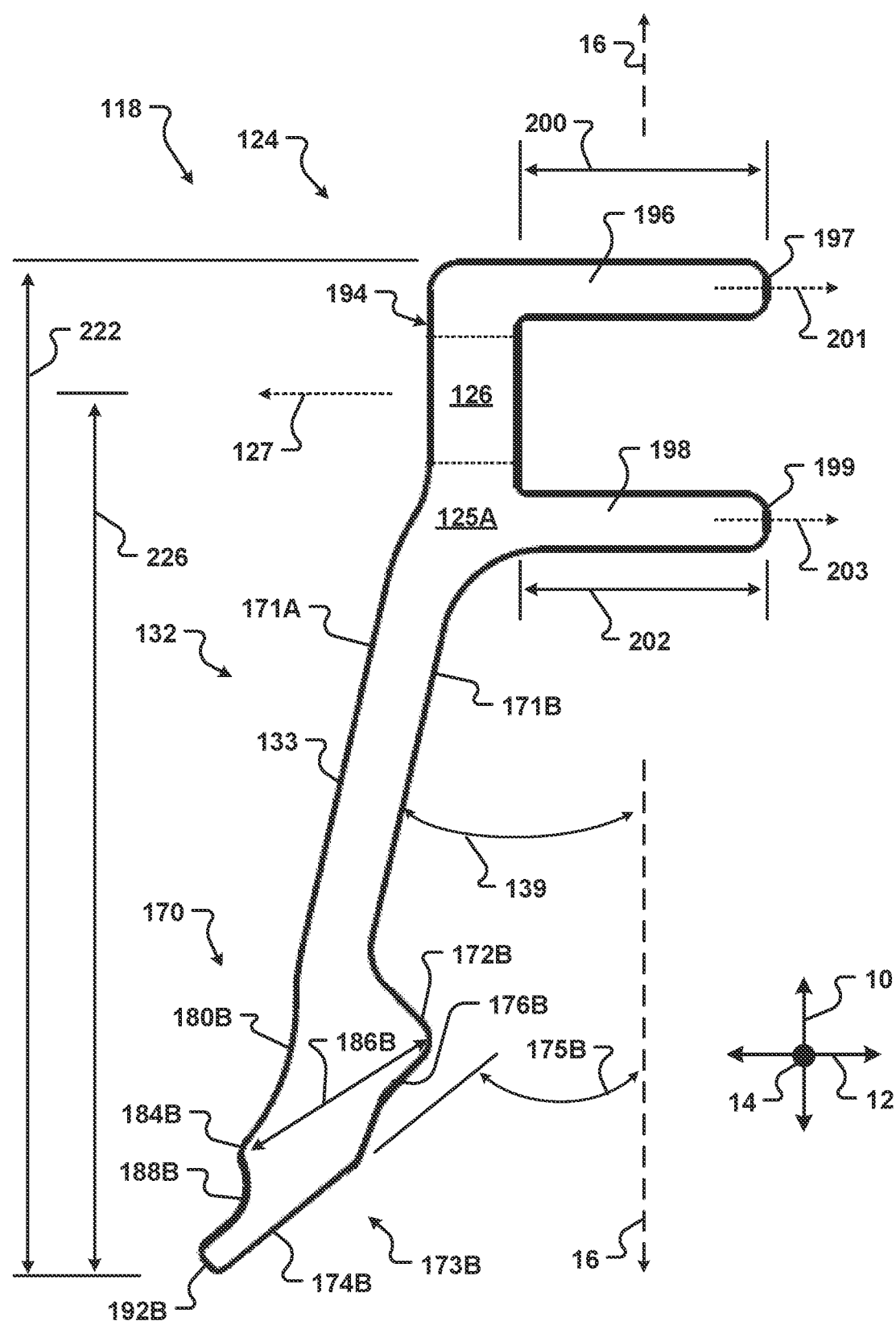
FIG. 2F is a front elevation view of a second component of the clamp of FIG. 2A.
Figure 2G:
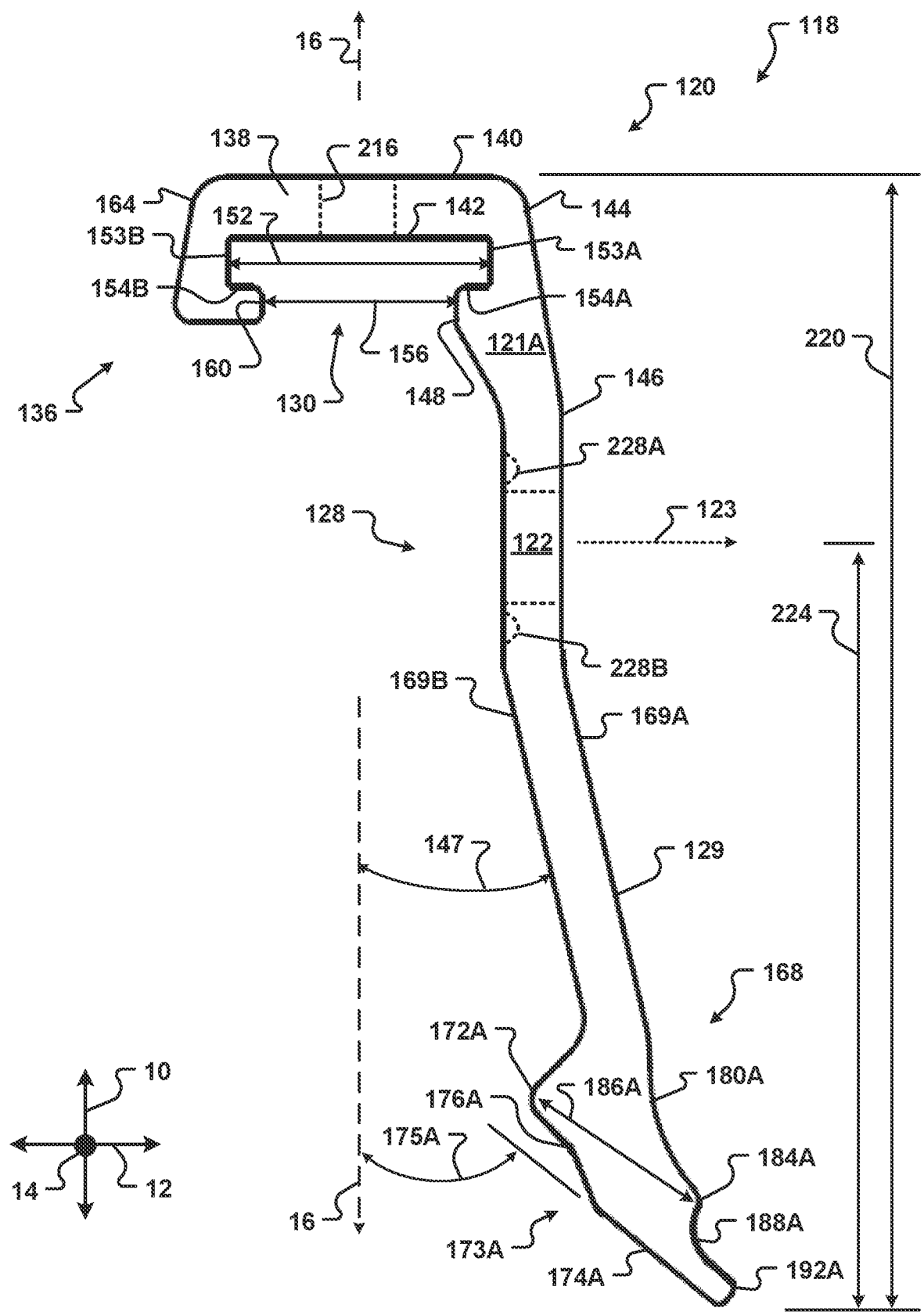
FIG. 2G is a front elevation view of a first component of the clamp of FIG. 2A.

Referring now to FIG. 2G, the first component 120 comprises a first riser 128 extending between a mounting interface 136 and a first foot 168. The first component 120 includes a first or outer surface 169A and a second or inner surface 169B which faces the reference plane 16 in FIG. 2G.

The mounting interface 136 comprises a first shoulder or protrusion 148 on a first side of the reference plane 16, a first side portion 144, an upper wall 138 having an upper surface 140, a second side portion 164, and a second shoulder 160 positioned opposite to the first shoulder 148 on a second side of the reference plane 16.

Figure 2H:
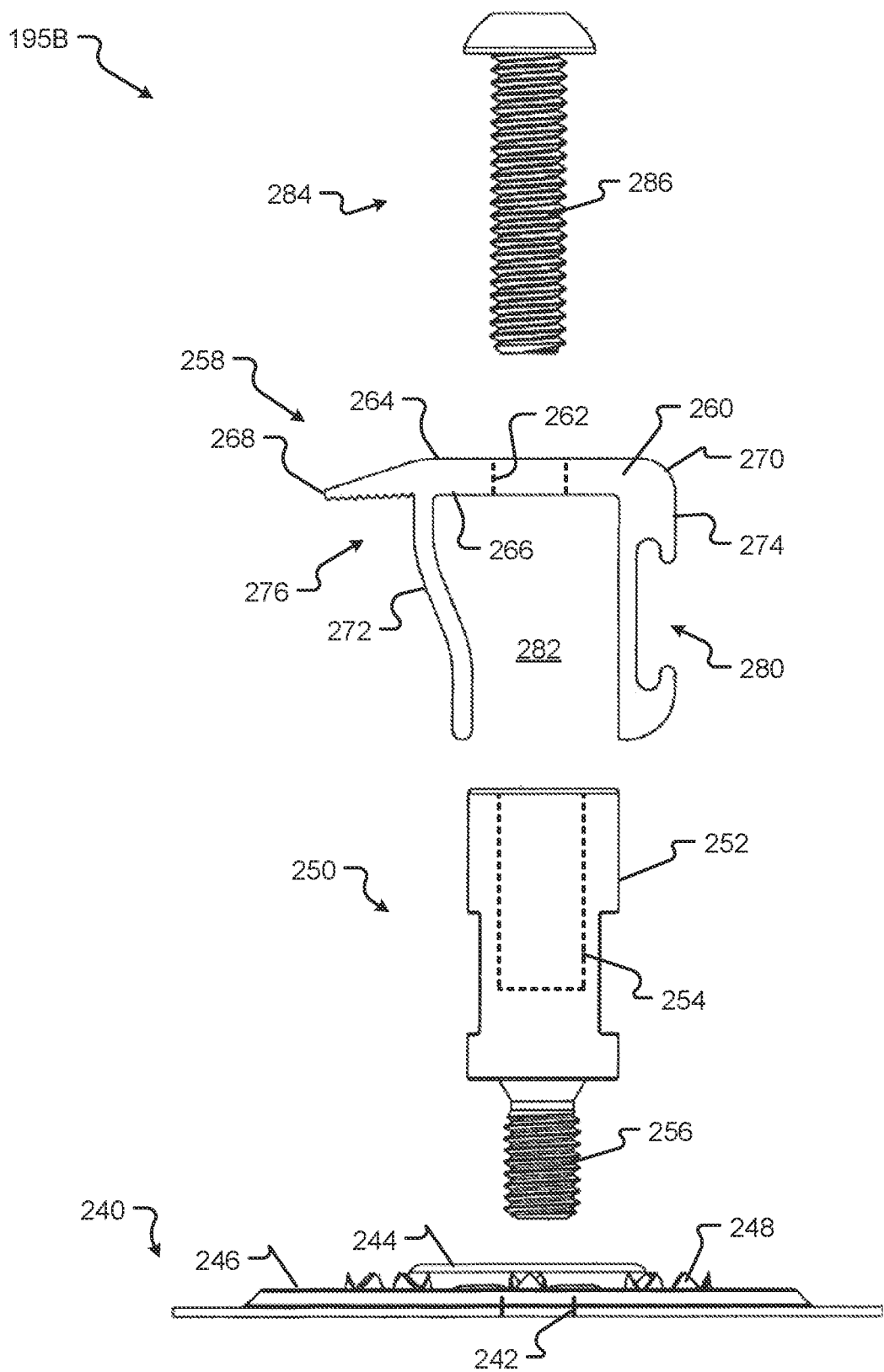
FIG. 2H is a front elevation view of an accessory that may be interconnected to the mounting system of the present disclosure

In some embodiments, the upper surface 140 is generally planar which is beneficial for interfacing with an accessory, such as accessory 195A illustrated in FIG. 2A or accessory 195B shown in FIG. 2H. The upper surface 140 may be oriented approximately perpendicular to the reference plane 16 (or approximately parallel to the lateral dimension 12).

In some embodiments, an open space between the first side portion 144 and the second side portion 164 defines an upper slot portion 152. The upper slot portion 152 has a first slot width measured in the lateral dimension 12. In some embodiments, a mounting aperture 216 extends through the upper wall 138 to the upper slot portion 152.

The upper slot portion 152 is defined by two opposed slot sidewalls 153A, 153B. In some embodiments, the sidewalls 153 are approximately parallel to the reference plane 16.

The slot sidewalls 153 extend away from a lower surface 142 of the upper wall 138 in the vertical dimension 10. Optionally, the slot sidewalls 153 extend between the lower surface 142 and lower walls 154A, 154B. When present, the lower walls 154 may be oriented approximately perpendicular to the reference plane 16. Accordingly, the upper slot portion 152 may be described as extending approximately parallel to the longitudinal dimension 14.

Optionally, an empty space between the first shoulder 148 and the second shoulder 160 defines a lower slot portion 156. The lower slot portion 156 has a second slot width measured in the lateral dimension 12 between the first and second shoulders 148, 160. The second slot width is less than the first slot width of the upper slot portion 152.

The lower slot portion 156 has an upper end that is open. Accordingly, the lower slot portion 156 is accessible from the mounting aperture 216 and the upper slot portion 152.

In some embodiments, the lower slot portion 156 has an open lower end opposite to the lower surface 142 of the upper wall 138 as generally illustrated in FIG. 2G. Alternatively, the lower slot portion 156 may have a closed lower end defined by a lower wall positioned opposite to the upper wall 138.

The upper slot portion 152 and lower slot portion 156 together form a nut retention slot 130. The nut retention slot 130 is shaped to receive a flanged nut or other fastener 134 such as generally illustrated in FIGS. 2A, 2B.

Optionally, the upper slot portion 152 is sized to receive the flange 137 of the flanged nut or other fastener 134. More specifically, the upper slot portion 152 has a height and a first slot width at least equal to a height (or thickness) and a width of the flange 137.

In some embodiment, the lower slot portion 156 sized to receive the body 135 of the flanged nut or other fastener 134. For example, the second slot width of the lower slot portion may be approximately equal to (or greater than) a width of the fastener 134 measured between two opposing flat sides of the body 135.

In some embodiments, the nut retention slot 130 may extend along a length 204 of the first component 120 (illustrated in FIG. 2D). For example, in embodiments, the nut retention slot 130 extends from the first end 121A to the second end 121B of the first component 120. Accordingly, the nut retention slot 130 may have two open ends as generally illustrated in FIG. 2G.

Alternatively, in other embodiments, the nut retention slot 130 may extend only along a portion of the length 204 of the first component 120 in the longitudinal dimension 14. Accordingly, in some embodiments, the nut retention slot 130 has one or two closed ends.

The flange 137 of the flanged nut or other fastener 134 may be positioned in the upper slot portion 152 and rest on the lower walls 154A, 154B above the first and second shoulders 148 and 160 to facilitate engagement of a mounting fastener 218 (inserted through the mounting aperture 216 extending through the upper wall 138) with the flanged nut or other fastener 134.

The second slot width between the first shoulder 148 and the second shoulder 160 may be sufficiently large to receive the body 135 of the flanged nut or other fastener 134, but not large enough to permit rotation of the flanged nut or other fastener 134. As a result, the nut retention slot 130 beneficially secures the flanged nut or other fastener 134 during engagement of a mounting fastener 218 therewith, such that a user of the mounting system 100 does not have to hold the flanged nut or other fastener 134 manually or with a tool.

The first riser 128 generally includes an upper portion 146 extending away from the mounting interface 136. A lower portion 129 extends from the upper portion 146 to the first foot 168.

In some embodiments, the upper portion 146 is oriented at an oblique angle to the lower portion 129. Optionally, at least a portion of the upper portion 146 (such as its inner surface 169B) is oriented approximately parallel to the reference plane 16.

In some embodiments, the lower portion 129 is oriented at an angle 147 relative to the reference plane 16. Optionally, the angle 147 has a magnitude of between about 10° and about 16°, or about 13° relative to the reference plane 16.

The first foot 168 comprises a heel 172A extending from the inner surface 169B. The heel is generally convex and oriented toward the reference plane 16. In some embodiments, the heel 172A is defined by a second radius of curvature. The second radius of curvature is slightly smaller than a first radius of curvature of the inset portion 114 of metal panel 104. In this manner, first component 120 can pivot relative to the inset portion 114 when securing the clamp 118 to a standing seam 106.

A lower surface or sole 173A extends from the heel 172A away from the reference plane 16. Optionally, at least a front portion 174A of the sole 173A is generally planar.

The front portion 174A is oriented at a predetermined angle 175A relative to the reference plane 16. In some embodiments, the angle 175A is an oblique angle relative to one or more of the reference plane 16 and the inner surface 169B of the first riser 128. Optionally, the angle 175A has a magnitude of between about 48° and about 56°, or about 52° relative to the reference plane 16.

In some embodiments, the sole includes an arch 176A. The arch may be generally concave and extends away from a plane defined by the front portion 174A.

The sole 173A generally extends between the heel 172A and a toe 192A. In some embodiments, the toe 192A defines a lowermost portion of the first component 120.

From the toe 192A, the first foot 168 extends to a lower bridge 188A that is positioned opposite to the front portion 174A of the sole. The lower bridge 188A is generally concave. In some embodiments, the lower bridge 188A is curved with a substantially constant radius of curvature.

Optionally, the lower bridge 188A is defined by a third radius of curvature. In some embodiments, the third radius of curvature is greater than the second radius of curvature of the heel 172A.

The lower bridge extends to a knuckle 184A. The knuckle is convex and extends away from the front portion 174A of the sole 173A.

An upper bridge 180A extends between the knuckle 184A and a lower portion of the exterior surface 169A of the first riser 128. The upper bridge may be defined by a fourth radius of curvature. Optionally, the fourth radius of curvature is greater than one or more of the second radius of curvature and the third radius of curvature.

In some embodiments, portions of the first component 120 that will contact the metal panel (such as the inner surface 169B and elements of the first foot 168) are designed to have smooth or rounded edges to prevent or reduce damage or scratches to the metal panel 104 during installation or use of the clamp 118.

Referring now to FIG. 2B, the various elements of the first foot 168 are intended to reduce the likelihood that the first component 120 will shift relative to the metal panel 104 once the mounting system 100 is installed. More specifically, the heel 172A is configured to lodge in the inset portion 114 of the panel 104, thus reducing the likelihood of the first component 120 shifting in the vertical dimension 10.

The heel 172A also serves as a pivot point once the toe 192A has been inserted into the channel 112 of the metal panel 104 and as the first component 120 is secured to the second component 124 by tightening the bolt 190. As may be appreciated by examining FIGS. 2A, 2B, tightening of the bolt 190 draws upper portions 146, 194 of the first and second components 120 and 124 closer together. Because the heel 172A of the first component 120 cannot move any closer to the second component 124 due to the metal panel 104 (and more specifically, due to the inset portion 114 of the metal panel 104), the heel 172A becomes a pivot point, and movement of the upper portion 146 of the first component 120 toward the second component 124 causes the toe 192A of the first component 120 to move away from the second component 124 (thus increasing the security of the fit between the first foot 168 and the metal panel 104). In some embodiments, the heel 172A of the first component compresses the first sidewall 113A of the metal panel 104 against a clip 103 positioned between the metal panel and a building surface.

The arch 176A of the first foot 168 has a shape configured to match the contour of the metal panel 104, thus increasing the surface area of contact and the amount of friction resisting movement of the first component 120 in the longitudinal dimension 14 (or perpendicular to the plane of FIG. 2B). The gently curved upper bridge 180A beneficially reduces stress risers in the transition between the first riser 128 and the knuckle 184A. The knuckle 184A is configured to press against the bend 116 of the metal panel 104.

Referring again to FIG. 2G, in some embodiments, a distance 186A between the heel 172A and the knuckle 184A of the first foot 168 may be slightly greater than a distance between the inset portion 114 and the bend 116 of the metal panel 104. In this manner, engagement of the first foot 168 with the metal panel 104 causes a slight deflection of the metal panel 104. This may introduce a bias into the metal panel 104 (e.g., due to the elasticity of the material from which the metal panel 104 is formed) that pushes the metal panel 104 against the first foot 168 so as to further increase a frictional force between the metal panel 104 and the first foot 168.

The lower bridge 188A closely matches the contour of the bend 116 of the metal panel 104, and therefore also increases the contact surface and the amount of friction resisting movement of the first component 120 relative to the metal panel 104. The toe 192A is shaped to extend into the channel 112, and to fit tightly within that channel.

As is evident from the above description, the first foot 168 is shaped to engage the contoured surface of the metal panel 104 in a way that decreases a likelihood of unintended or inadvertent movement of the first component 120 relative to the metal panel 104, whether in the vertical dimension 10, the lateral dimension 12, or the longitudinal dimension 14.

In some embodiments, the first component 120 may have a first height 220 (measured in the vertical dimension 10, from the bottom of the toe 192A of the first foot 168 to the upper surface 140) of between 2 inches and 5 inches. In some embodiments, the first height 220 of the first component 120 may be between 2.5 inches and 4 inches. In still other embodiments, the height of the first component 120 may be between 3 inches and 3.5 inches.

In some embodiments, a first aperture 122 is formed through the upper portion 146 of the riser 128. A fastener, such as a bolt 190, may extend through the first aperture to connect the first component 120 to the second component 124.

Although only one first aperture 122 is illustrated, the first component 120 may have one or more first aperture 122. For example, in some embodiments, the first component 120 has two or more first apertures 122.

The first aperture 122 may be generally cylindrical. Alternatively, the first aperture 122 may be elongated in one or more dimensions. In some embodiments, the first aperture 122 is elongated in the vertical dimension 10 to define a slot.

In some embodiments, the first aperture 122 is threaded. Alternatively, in other embodiments, the first aperture 122 is not threaded.

In embodiments, the first aperture 122 is not threaded and has a width or a diameter greater than a shaft 191 of a bolt 190 directed therethrough. In this manner, relative movement between first component 120 and the bolt is allowed in more than one dimension (i.e., in addition to the movement of the bolt relative to the first component along an axis 123 while installing the bolt). Generally, this size difference allows for at least some relative movement between the bolt 190 and the first component in more than one dimension (e.g., other than along an axis that the shaft 191 of the bolt extends), which may be a benefit while securing the clamp 118 to a standing seam 106.

Optionally, the first aperture 122 extends along a first aperture axis 123. More specifically, the first aperture 122 may optionally be concentrically aligned with the first aperture axis 123. In some embodiments, the first aperture axis 123 is oriented approximately parallel to the lateral dimension 12. The first aperture axis 224 is spaced from the toe 192A by a distance 224.

The first aperture axis 123 may be oriented approximately perpendicular to the reference plane 16. Alternatively, the aperture axis 123 may be oriented at an oblique angle relative to the reference plane.

Also in some embodiments, the first component 120 may optionally comprise one or more depressions 228 extending into the inner surface 169B. The one or more depressions 228 are positioned and oriented to receive a free end 197, 199 of one or both of arms 196 and 198 of the second component 124.

The first component 120 may have a first depression 228A positioned above the first aperture 122. Additionally, or alternatively, a second depression 228B may be positioned below the first aperture. In some embodiments, the depressions 228 are elongated grooves that extend in the longitudinal dimension 14. Optionally, the grooves 228 extend from the first end 121A to the second end 121B of the first component 120.

Referring now to FIG. 2F, the second component 124 comprises a second riser 132 extending between an upper portion or spacer 194 and a second foot 170. The second riser 132 includes a lower portion 133, an outer surface 171A and an inner surface 171B.

In some embodiments, the lower portion 133 is optionally oriented at an angle 139 relative to the reference plane 16. In some embodiments, the angle 139 is an oblique angle. For example, in some embodiments, the angle 139 between the inner surface 171B of the second riser 132 and the reference plane 16 has a magnitude of between about 10° and about 16°, or about 13°. Optionally, the angle 139 has a magnitude that is approximately equal to the magnitude of angle 147 between the lower portion 129 of the first riser and the reference plane 16.

In some embodiments, the spacer 194 comprises a second aperture 126 through which a shaft 191 of the bolt 190 may extend. The second aperture may be generally cylindrical. Alternatively, the second aperture 126 may be elongated in the vertical dimension 10 to define a slot.

Although only one second aperture 126 is illustrated, the second component may have one or more second aperture. For example, in some embodiments, the second component 124 has two or more second apertures 126.

Like the first aperture 122, the second aperture 126 is threaded in some embodiments. Alternatively, the second aperture 126 is not threaded in other embodiments.

In some embodiments, the second aperture 126 extends along a second aperture axis 127. More specifically, the second aperture 126 may optionally be concentrically aligned with the second aperture axis 127. In some embodiments, the second aperture axis 127 is oriented approximately parallel to the lateral dimension 12. The second aperture axis 127 may be oriented approximately perpendicular to the reference plane 16.

The spacer 194 of the second component 124 optionally includes one or more of a first arm 196 with a first end 197 and a second arm 198 with a second end 199. The first arm 196 may be referred to as a first spacing arm. The second arm 198 may be referred to as a second spacing arm.

The first arm 196 generally extends away from an inner surface 171B of the second component 124 along a first axis

201. The second arm 196 extends from the inner surface along a second axis 203. In some embodiments, the first and second axes 201, 203 are approximately parallel. Accordingly, the first and second arms 196, 198 may be described as being approximately parallel.

Optionally, one or more of the first and second axes 201, 203 is approximately perpendicular to the vertical dimension 10. Additionally, or alternatively, one or more of the axes 201, 203 are approximately parallel to the axis 127 of the second aperture 126 in some embodiments.

The first arm 196 has a first length 200 measured in the lateral dimension 12 and the second arm 198 has a second length 202 measured in the lateral dimension. In some embodiments, the first and second lengths 200, 202 are approximately equal. Optionally, the first and second lengths may correspond to a width 115B of an upper portion of the standing seam 106 formed by the metal panels 104 and 108. In this manner, the ends 197, 199 of arms 196, 198 will contact the interior surface 169B of the first riser 128 to prevent the second component 124 from moving too close to the first component 120 as the bolt 190 is tightened to prevent damage to the standing seam 106.

The first arm 196 and the second arm 198 may be spaced from each other by the width (or diameter) of the second aperture 126. In some embodiments, the first and second arms are spaced apart by a distance that is greater than the width of the second aperture. In some embodiments, the free ends 197, 199 of the arms 196 and 198 may be flat, to facilitate engagement thereof with the first riser 128 when the bolt 190 or other fastener draws the second component 124 toward the first component 120. In other embodiments, the first ends of the arms 196 and 198 may be curved.

Like the first foot 168, the second foot 170 comprises one or more of a heel 172B, a sole 173B with an arch 176B and a front portion 174B, a toe 192B, a lower bridge 188B, a knuckle 184B, and an upper bridge 180B facing away from the heel 172B. In some embodiments, the components of the second foot 170 are similar or identical to the components of the first foot 168 and provide the same benefits relative to the metal panel 108 that the components of the first foot 168 provide relative to the metal panel 104. In addition, the components of the second foot 170 may have the same or similar orientations and dimensions as corresponding components of the first foot.

For example, a distance 186B between the heel 172B and the knuckle 184B of the second foot 170 may be approximately equal to the distance 186A of the first foot. Accordingly, distance 186B may be slightly greater than a distance between the inset portion 114 and the bend 116 of the metal panel 108. In this manner, engagement of the second foot 170 with the metal panel 108 causes a slight deflection of the metal panel 108. This may introduce a bias into the metal panel 108 (e.g., due to the elasticity of the material from which the metal panel 108 is formed) that pushes the metal panel 108 against the second foot so as to further increase a frictional force between the metal panel 108 and the second foot.

Additionally, the front portion 174B of the sole 173B is oriented at an angle 175B relative to the reference axis that has the same or similar magnitude as angle 175A of the first foot. For example, the angle 175B may have a magnitude of between about 48° and about 56°, or about 52° relative to the reference plane 16 in some embodiments.

Referring again to FIGS. 2A-2B, the second component 124 interfaces with the second sidewall 113B of the rib 106 opposite to the first component 120 on the first sidewall 113A of the rib. In some embodiments, the heel 172B of the second component compresses the second sidewall 113B of the metal panel 108 against a clip 103 when present and positioned beneath the metal panel.

As generally illustrated in FIG. 2F, the second component 124 may have a second height 222 (measured in the vertical dimension 10), from the bottom of the toe 192B of the second foot 170 to the top surface of the first arm 196. In some embodiments, the second height 222 is less than the first height 220 of the first component. Optionally, the second height 222 is between 1.5 inches and 4.5 inches. In some embodiments, the second height of the second component 124 may be between 2 inches and 3.5 inches. In still other embodiments, the second height 222 of the second component 124 may be between 2 inches and 2.5 inches.

The second aperture axis 127 is spaced from the toe 192B by a distance 226. In some embodiments, the distance 226 is approximately equal to the distance 224 between the first aperture axis 123 and toe 192A. In addition, when the first and second components are interconnected, the axes 123, 127 may be substantially concentrically aligned.

Referring again to FIGS. 2A, 2B, the first component 120 and the second component 124 may be secured to each other with a bolt 190. The bolt 190 may be inserted first through the first aperture 122 of the first component 120 and then through the second aperture 126 of the second component 124, as generally illustrated in FIGS. 2A, 2B. Alternatively, the bolt 190 may be inserted first through the second aperture 126 of the second component 124, and then through the first aperture 122 of the first component 120. The bolt 190 may be threaded, as shown in FIG. 2A, and may engage threading in one or both of the apertures 122, 126 of the first component 120 and the second component 124.

In some embodiments, mechanical fasteners other than a bolt 190 may be used to secure the first component 120 to the second component 124. Also in some embodiments, the first component 120 and the second component 124 may each comprise a plurality of apertures, and the mounting system 100 may comprise a plurality of bolts 190 or other fasteners, each extending through one aperture of the first component 120 and one aperture of the second component 124.

Referring now to FIG. 2A, with the first component 120 secured to the second component 124 with a bolt 190 or other fastener, the mounting system 100 comprises a slot 182 sized to receive the standing seam 106 where the metal panels 104 and 108 are joined. The slot 182 may have a width 183 in the lateral dimension 12 that varies as a width 115 of the standing seam 106 generally decreases in the vertical dimension 10. For example, the slot 182 may have a lower portion (e.g., in the vertical dimension 10) with a first width 183A and an upper portion with a second width less than the first width 183A. The first width 183A may be measured between ends of the toes 192A, 192B.

Notably, a width 181 between the bends 116 of the panels 104, 108 may be less than the first width 183A. Accordingly, when the clamp 118 is positioned on a seam 106, the engagement of the toes 192 within the channels 112 of the panels prevents or reduces unintended movement of the clamp 118 in the vertical dimension.

The slot 182 may narrow to at least a local minimum width 183B between the heels 172A, 172B. The local minimum width 183B is less than the first width 183A. In some embodiments, the minimum width 183B is less than a maximum width 115A of the standing seam 106 as generally illustrated in FIG. 2A. Accordingly, engagement of the heels 172 with the inset portions 114 of metal panels 104, 108 prevents or limits movement of the clamp 118 in the vertical dimension 10. When the mounting system 100 is secured to the standing seam 106, the mounting interface 136 provides a stable mounting point for securing an accessory 195 (e.g., a clamp, mounting kit, or other hardware or device) to the standing seam 106.

FIG. 2D shows a top plan view of a clamp 118 according to embodiments of the present disclosure. A mounting aperture 216 extending through the upper wall 138 of the first component 120 is generally illustrated. Optionally, the mounting aperture 216 extends along an axis that is oriented approximately parallel to the vertical dimension 10.

Although only one mounting aperture 216 is illustrated, the first component 120 may have any number of mounting apertures 216. For example, from one to six mounting apertures 216 may be formed through the upper wall 138.

The mounting aperture 216A may be generally circular in some embodiments. Alternatively, in other embodiments, the mounting aperture 216B is elongated in the longitudinal dimension 14 that is orthogonal to the vertical 10 and horizontal 12 dimensions. The elongated mounting aperture 216B can have any desired length. In some embodiments, the elongated mounting aperture 216B has a length 208 that is less than a length 204 of the first component 120. Accordingly, the elongated mounting aperture 216B may have one or two closed ends 217 spaced from the first and second ends 121A, 121B of the first component 120. Optionally, an elongated mounting aperture 216C may extend to one or more of the first end 121A and the second end 121B of the first component 120.

The mounting aperture 216 may be sized to receive a mounting fastener 218 (illustrated in FIG. 2B) that engages a flanged nut or other fastener 134 positioned within the nut retention slot 130 to secure an accessory 195 to the mounting system 100, and thus to the standing seam 106. For example, the mounting aperture 216 has a predetermined width 212 to receive a shaft of a mounting fastener 218.

In some embodiments, the mounting aperture 216A may or may not be threaded. In at least some embodiments of the present disclosure, the mounting aperture 216A is circular and threaded, and the mounting interface 136 does not comprise a nut retention slot. Instead, a threaded mounting fastener simply engages the mounting aperture 216 to secure the accessory 195 or another device to the clamp 118.

In still other embodiments, the mounting aperture 216B is elongate and unthreaded. Optionally, the first component 120 does not comprise one or more of the first and second shoulders 148 and 160 and may not comprise the second side portion 164. In such embodiments, a bolt or other mechanical mounting fastener may be inserted into the mounting aperture 216 from underneath the upper wall 138, so that a head portion of the bolt or other mechanical mounting fastener is positioned between the upper wall 138 and the first arm 196, and the shank of the bolt or other mechanical mounting fastener protrudes upwardly above the upper surface 140, where it may be engaged by an accessory such as the accessory 195. In such embodiments, a nut or other complimentary fastener may be threaded onto or may otherwise engage with the shank of the bolt or other mechanical mounting fastener from above the upper surface 140.

In still other embodiments, the upper wall 138 comprises a plurality of mounting apertures 216. In some embodiments, one or more mounting apertures 216B may extend to an end 121A, 121B of the upper wall 138. In such embodiments, a bolt or other mechanical mounting fastener may be inserted into the mounting aperture 216 along the longitudinal dimension 14 from an end 121A, 121B of the mounting interface 136. In this manner, a head portion of the bolt or other mechanical mounting fastener may be positioned in the nut retention slot 130 and the shank of the bolt or other mechanical mounting fastener protrudes through the aperture 216B and upwardly above the upper surface 140, where it may be engaged by an accessory such as the accessory 195.

FIG. 2D includes dimensions of aspects of the mounting system 100 according to at least one embodiment of the present disclosure. For example, the mounting aperture 216 may have a width 212 of between 0.25 inches and 1 inch, or between 0.3 inches and 0.8 inches, or between 0.35 inches and 0.6 inches. The mounting aperture 216 may have a length 208 equal to the width 212 thereof (in embodiments where the mounting aperture 216A is circular). Alternatively, an elongated mounting aperture 216B may have a length 208 between 0.5 inches and 2 inches, or between 0.75 inches and 1.75 inches, or between 0.9 inches and 1.2 inches. The mounting system 100 may have an overall length 204 between 1 inch and 4 inches or between 1.5 inches and 3 inches, or between 2 inches and 3 inches.

Referring now to FIG. 2G, elements of one embodiment of an accessory 195B suitable for use with the clamp 118 are generally illustrated. The accessory 195 generally comprises a mounting plate 240, a stanchion 250, a PV clamp 258 such as to engage a PV module, and a clamping fastener 284.

The mounting plate 240 generally comprises a central aperture 242 that is alignable with the mounting aperture 216 of the clamp 118. The central aperture is unthreaded. An inner annular projection 244 may extend around the central aperture. The inner annular projection extends above an outer annulus of the mounting plate 240 to a first height. An outer annular projection 246 optionally surrounds the inner annular projection. The outer annular projection 246 extends above the outer annulus to a second height that is less than the first height. Grounding projections 248 may extend upwardly from a surface of the mounting plate. In some embodiments, the mounting plate is generally circular.

The stanchion 250 generally comprises a body portion 252 with a first threaded hole 254 and a first threaded shaft 256. The first threaded shaft 256 is sized to extend through the central aperture 242 of the mounting plate 240 and through the mounting aperture 216 to interconnect the stanchion and the mounting plate to the clamp 118.

The PV clamp 258 comprises an upper wall 260 with an aperture 262, a first surface 264 and a second surface 266. The upper wall 260 extends from a first edge 268 to a second edge 270. In some embodiments, the aperture 262 is unthreaded.

A first sidewall 272 extends from the second surface 266. The first sidewall 272 is spaced or offset from the first edge 268 to form a first clamping section 276. At least a portion of the first sidewall 272 may be approximately perpendicular to the second surface 266.

A second sidewall 274 extends from the second surface. At least a portion of the second sidewall may be approximately perpendicular to the second surface 266. In some embodiments, a channel 280 is formed in the second sidewall. Alternatively, the second sidewall 274 is spaced or offset from the second edge 270 to form a second clamping section 278 as generally illustrated in FIG. 2A.

A space between interior surfaces of the first and second sidewalls 272, 274 defines a stanchion receptacle 282. At least a bottom portion of the first sidewall 272 is spaced from a bottom portion of the second sidewall 274 by a width of the stanchion, such that at least a portion of each of the two sidewalls contact the stanchion 250 when the stanchion is positioned within the stanchion receptacle 282 (as generally illustrated in FIG. 2A).

The clamping fastener 284 may be used to interconnect the PV clamp 258 to the stanchion 250. The clamping fastener 284 has a threaded shaft 286 configured to extend through the aperture 262 of the PV clamp 258 and engage threads within the first threaded hole 254.

Figure 3:
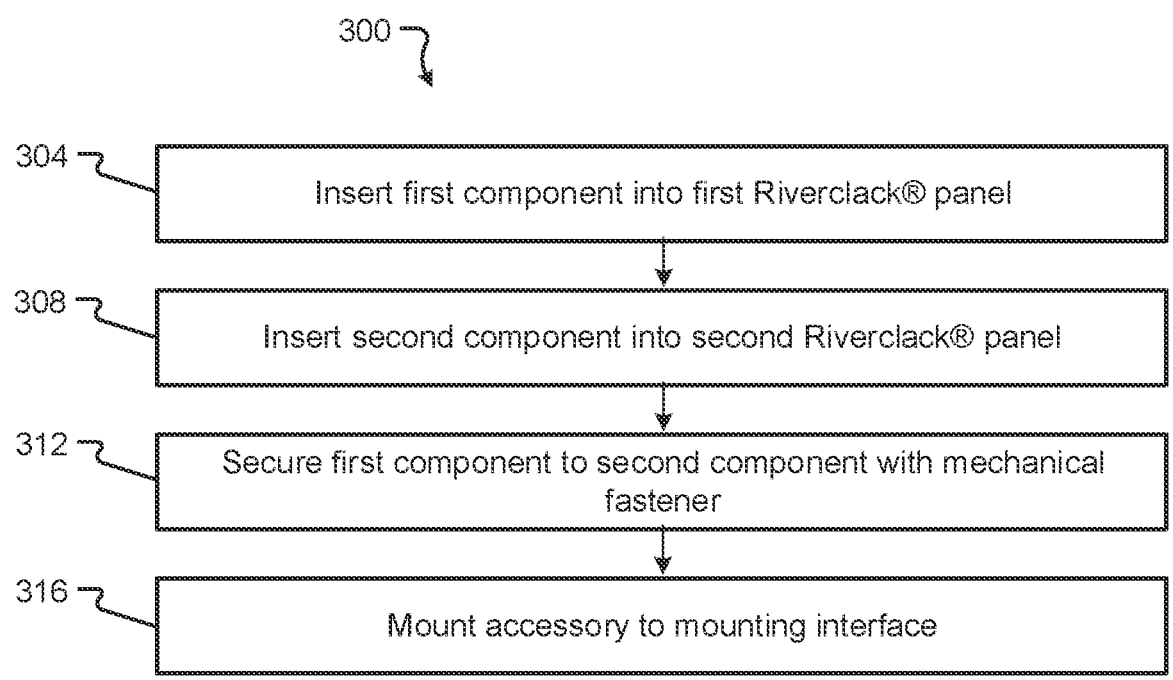
FIG. 3 is a flowchart of a method according to at least one embodiment of the present disclosure.

Turning now to FIG. 3, a method 300 of installing a mounting system 100 comprises inserting a first component of the mounting system according to embodiments of the present disclosure into a first Riverclack® panel (step 304). For example, a first component 120 of a mounting system 100 may be inserted into a first Riverclack® panel 104 by inserting the first foot 168 of the first component 120 into a channel 112 of the first Riverclack® panel 104 such that the knuckle 184A engages the bend 116 and the heel 172A is seated within the inset 114.

The method 300 also comprises inserting a second component of the mounting system into a second Riverclack® panel (step 308). For example, a second component 124 of the mounting system 100 may be inserted into the second Riverclack® panel 108 by inserting the second foot 170 of the second component 124 into a channel 112 of the second Riverclack® panel 104 such that the knuckle 184B engages the bend 116 and the heel 172B is seated within the inset 114. In some embodiments, the step 308 precedes the step 304.

The method 300 further comprises securing the first component to the second component with a mechanical fastener (step 312). For example, a first component 120 may be secured to a second component 124 with a bolt 190. In various embodiments of the present disclosure, the mechanical fastener may be a threaded bolt, a clevis bolt/pin, a screw, a clamp, or any other mechanical fastener. In some embodiments, the mechanical fastener may be a threaded fastener that engages threads in a first aperture 122 of the first component and/or threads in a second aperture 126 of the second component. In other embodiments, the mechanical fastener may extend through unthreaded apertures 122, 126 in the first component and the second component.

The mechanical fastener may first be inserted through a first aperture 122 of the first component first. Alternatively, the mechanical fastener may be inserted through a second aperture 126 of the second component first. In still other embodiments (e.g., where the mechanical fastener is a clamp), the mechanical fastener may not utilize an aperture in one or both of the first component and the second component. In embodiments where the mechanical fastener is a bolt, a nut may be threaded onto the bolt to secure the first component to the second component.

As a portion of a first component 120 above the heel 172A of the first foot 168 is drawn toward a portion of a second component 124 above the heel 172B of the second foot 170, each of the first component 120 and the second component 124 will rotate slightly around a pivot point at or near the respective heels 172A, 172B of the first foot 168 and the second foot 170. This rotation will push the first foot 168 into tighter engagement with the first Riverclack® panel 104 and will push the second foot 170 into tighter engagement with the second Riverclack® panel 108, thus improving the ability of the mounting system 100 to resist movement thereof relative to the Riverclack® panels.

Moreover, because Riverclack® panels are installed in clips 103 that extend underneath the standing seams where adjacent Riverclack® panels engage each other, use of the mounting system 100 beneficially improves engagement of the Riverclack® panels with the underlying clip, while exerting force primarily on portions of the Riverclackx panels that are well supported (e.g., by the underlying clip) and largely avoiding contact with (and thus any damage to) the standing seam itself (which extends upward into the slot 182 formed underneath the second arm 198 of the second component 124).

The method 300 optionally comprises mounting an accessory (e.g., a clamp, a mounting kit, or other hardware or device) to the mounting interface of the first component (step 316). For example, an accessory 195 may be mounted to a mounting interface 136 of a first component 120. The accessory may be mounted to the mounting interface in any manner described herein. In some embodiments, the step 316 may occur prior to insertion of the first component into the first Riverclack® panel.

Ranges have been discussed and used within the forgoing description. One skilled in the art would understand that any sub-range within the stated range would be suitable, as would any number or value within the broad range, without deviating from the disclosure. Additionally, where the meaning of the term "about" as used herein would not otherwise be apparent to one of ordinary skill in the art, the term "about" should be interpreted as meaning within plus or minus five percent of the stated value.

Throughout the present disclosure, various embodiments have been disclosed. Components described in connection with one embodiment are the same as or similar to like-numbered components described in connection with another embodiment.

The present disclosure, in various aspects, embodiments, and/or configurations, includes components, methods, processes, systems and/or apparatus substantially as depicted and described herein, including various aspects, embodiments, configurations embodiments, sub-combinations, and/or subsets thereof. Those of skill in the art will understand how to make and use the disclosed aspects, embodiments, and/or configurations after understanding the present disclosure. The present disclosure, in various aspects, embodiments, and/or configurations, includes providing devices and processes in the absence of items not depicted and/or described herein or in various aspects, embodiments, and/or configurations hereof, including in the absence of such items as may have been used in previous devices or processes, e.g., for improving performance, achieving ease and/or reducing cost of implementation.

The foregoing discussion has been presented for purposes of illustration and description. The foregoing is not intended to limit the disclosure to the form or forms disclosed herein. In the foregoing Detailed Description, for example, various features of the disclosure are grouped together in one or more aspects, embodiments, and/or configurations for the purpose of streamlining the disclosure. The features of the aspects, embodiments, and/or configurations of the disclosure may be combined in alternate aspects, embodiments, and/or configurations other than those discussed above. This method of disclosure is not to be interpreted as reflecting an intention that the claims require more features than are expressly recited in each claim. Rather, as the following claims reflect, inventive aspects lie in less than all features of a single foregoing disclosed aspect, embodiment, and/or configuration. Thus, the following claims are hereby incorporated into this Detailed Description, with each claim standing on its own as a separate preferred embodiment of the disclosure.

Moreover, though the description has included description of one or more aspects, embodiments, and/or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and/or configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

To provide additional background, context, and to further satisfy the written description requirements of 35 U.S.C. § 112, the following references are incorporated by reference herein in their entireties: U.S. Pat. Nos. 6,718,718; 7,703,256; 7,712,278; 7,758,011; 8,844,234; 9,611,652; 9,920,958; 10,054,336; 10,077,562; 10,903,785; U.S. Pat. App. Pub. 2016/0130815; and U.S. Pat. App. Pub. 2018/0128295.

What is claimed is:

1. A clamp, comprising:
 a first component, comprising:
  a first riser having a top portion, a bottom portion, and a first aperture extending therethrough;
  a mounting interface extending from the top portion of the first riser, the mounting interface comprising a mounting aperture and having a first end separated from a second end opposite the first end by a first length; and
  a first foot extending from the bottom portion of the first riser and away from the mounting interface, the first foot having a first heel proximate the bottom portion of the first riser and terminating in a first toe, wherein the first foot comprises:
   an upper bridge extending from an exterior surface of the first riser;
   a knuckle extending from the upper bridge;
   a lower bridge extending from the knuckle;
   the first toe extending from the lower bridge;
   a lower surface extending between the first toe and the first heel and including an arch; and
   the first heel extending from an interior surface of the first riser; and
 a second component, comprising:
  a second riser having a top portion, a bottom portion, and a second aperture extending therethrough;
  a first arm extending from the top portion of the second riser;
  a second foot extending from the bottom portion of the second riser and away from the first arm, the second foot having a second heel proximate the bottom portion of the second riser and terminating in a second toe; and
  a second arm extending from the second riser in between the second aperture and the second foot.

2. The clamp of claim 1, wherein the mounting aperture comprises an elongate slot having a second length less than the first length of the mounting interface.

3. The clamp of claim 1, wherein the mounting interface further comprises a nut retention slot extending from the first end to the second end.

4. The clamp of claim 1, wherein:
 the first arm extends along a first axis that is approximately perpendicular to a reference plane; and
 the second arm extends along a second axis that is approximately perpendicular to the reference plane, the second axis approximately parallel to the first axis.

5. The clamp of claim 1, further comprising a fastener extendable through the first aperture and the second aperture to secure the first component to the second component, wherein when the first component is secured to the second component, the first arm defines a plane that intersects the first riser between the mounting interface and the first heel, and wherein the first arm and the second arm are configured to maintain a predetermined distance between the first riser and the second riser when the first component is secured to the second component with the fastener.

6. The clamp of claim 1, wherein:
 the upper bridge is concave;
 the knuckle is convex; and
 the lower bridge is concave.

7. The clamp of claim 1, wherein when the first component is secured to the second component:
 the first riser is oriented at a first angle relative to a reference plane defined by the top portion of the first riser, the first angle having a first magnitude; and
 the second riser is oriented at a second angle relative to the reference plane, the second angle having a second magnitude that is approximately equal to the first magnitude.

8. The clamp of claim 1, wherein the first component and the second component are made of a metal.

9. A mounting system for use with a standing seam, comprising:
 a first side member, comprising:
  a mounting interface;
  a first foot; and
  a substantially planar portion including a first aperture between the mounting interface and the first foot;
 a second side member, comprising:
  a first arm with a first end;
  a second arm with a second end;
  a second aperture between the first and second arms; and
  a second foot; and
 a fastener extendable through the first aperture and the second aperture to secure the first side member to the second side member, wherein at least one of the respective first and second ends of the first and second arms contact a substantially planar interior surface of the substantially planar portion of the first side member to provide a predetermined spacing between the first foot and the second foot.

10. The mounting system of claim 9, wherein:
 the first foot is configured to engage a first channel of a first metal panel;
 the second foot is configured to engage a second channel of a second metal panel; and
 a slot formed between the first side member and the second side member is configured to receive the standing seam defined by the first metal panel and the second metal panel.

11. The mounting system of claim 10, wherein the first foot comprises a first heel and a first toe, the first toe configured to engage the first channel, and the first heel is configured to engage an inset portion of the first metal panel.

12. The mounting system of claim 9, wherein:
 one of the first aperture and the second aperture is not threaded; and
 the other one of the first aperture and the second aperture is threaded.

13. The mounting system of claim 9, wherein:
a first axis of the first aperture is spaced a first distance from a first toe of the first foot; and
a second axis of the second aperture is spaced a second distance from a second toe of the second foot, the second distance being approximately equal to the first distance.

14. The mounting system of claim 9, further comprising a mounting aperture extending through the mounting interface.

15. The mounting system of claim 14, wherein the mounting aperture is an elongated slot.

16. The mounting system of claim 14, wherein a vertical reference plane extends through the mounting interface and the mounting aperture, wherein the substantially planar portion of the first side member faces the vertical reference plane, and wherein the first foot comprises a first toe that faces away from the vertical reference plane.

17. The mounting system of claim 9, wherein an upper surface of the first arm defines a horizontal reference plane and no portion of the second side member intersects the horizontal reference plane, and wherein the horizontal reference plane intersects the first side member when the first side member is secured to the second side member.

18. The mounting system of claim 9, wherein the first arm of the second side member is positioned under the mounting interface of the first side member when the first side member is secured to the second side member.

19. A method of connecting a mounting system to a standing seam defined by first and second metal panels, comprising:
providing a first component of the mounting system, comprising:
a mounting interface;
a first foot comprising a first toe and a first heel; and
a first aperture between the mounting interface and the first foot;
inserting the first toe into a first channel of the first metal panel
positioning the first heel in a first inset portion of the first metal panel, such that the first component is self-supporting in a first upright orientation within the first channel and the first inset portion of the first metal panel;
providing a second component of the mounting system, comprising:
a first arm with a first end;
a second arm with a second end;
a second aperture between the first and second arms; and
a second foot comprising a second toe and a second heel;
positioning the second heel in a second inset portion of the second metal panel, such that the second component is self-supporting in a second upright orientation within the second channel and the second inset portion of the second metal panel; and
securing the first component to the second component with a fastener that extends through the first and second apertures, wherein at least one of the first and second ends of the arms of the second component engage an interior surface of the first component.

20. The method of claim 19, further comprising:
mounting an accessory to the mounting system by extending a fastener through a mounting aperture of the mounting interface.

* * * * *